US012737894B2

(12) United States Patent
Cheng et al.

(10) Patent No.: US 12,737,894 B2
(45) Date of Patent: Sep. 15, 2026

(54) METHODS AND SYSTEMS FOR MOTION VECTOR FILTERING

(71) Applicant: Pixelworks Semiconductor Technology (Shanghai) Co. Ltd., Shanghai (CN)

(72) Inventors: Guohua Cheng, Shanghai (CN); Neil Woodall, Newport Beach, CA (US); Hongmin Zhang, Santa Clara, CA (US)

(73) Assignee: PIXELWORKS SEMICONDUCTOR TECHNOLOGY (SHANGHAI) CO. LTD., Shanghai (CN)

( * ) Notice: Subject to any disclaimer, the term of this patent is extended or adjusted under 35 U.S.C. 154(b) by 405 days.

(21) Appl. No.: 18/521,823

(22) Filed: Nov. 28, 2023

(65) Prior Publication Data

US 2025/0173875 A1 May 29, 2025

(51) Int. Cl.
*G06T 7/20* (2017.01)
*G06T 5/77* (2024.01)

(52) U.S. Cl.
CPC .................. *G06T 7/20* (2013.01); *G06T 5/77* (2024.01); *G06T 2207/20024* (2013.01)

(58) Field of Classification Search
CPC ........................................................ G06T 5/77
USPC .......................................................... 382/100
See application file for complete search history.

(56) References Cited

U.S. PATENT DOCUMENTS 10,142,651 B1 11/2018 Cheng et al.
2011/0142289 A1 6/2011 Barenbrug et al.
2011/0216831 A1* 9/2011 Rossignol .............. H04N 19/50 375/E7.123
2021/0398291 A1* 12/2021 Sasaki ........................ G06T 5/73
2023/0115057 A1 4/2023 Zhang et al.
2024/0214607 A1* 6/2024 Li ........................ H04N 19/597
2024/0257358 A1* 8/2024 Kimura ..................... G06T 7/20
2025/0173877 A1* 5/2025 Cheng ..................... G06T 7/215

FOREIGN PATENT DOCUMENTS

CN 106954076 A 7/2017
WO 2023150488 A1 8/2023

OTHER PUBLICATIONS

Criminisi, A. et al., "Region filling and object removal by exemplar-based image inpainting," IEEE Transactions on Image Processing, vol. 13, No. 9, Sep. 2004, Available Online Aug. 16, 2004, 13 pages.
Xu, Z. et al., "Image Inpainting by Patch Propagation Using Patch Sparsity," IEEE Transactions on Image Processing, vol. 19, No. 5, May 2010, Available Online Feb. 2, 2010, 13 pages.

(Continued)

*Primary Examiner* — Gabriel I Garcia
(74) *Attorney, Agent, or Firm* — McCoy Russell LLP

(57) ABSTRACT

Systems and methods are herein provided for motion vector filtering to reduce hole size. In one example, a method comprises determining presence of one or more holes in an outputted image, wherein the outputted image was generated based on one or more motion vector (MV) fields and depth fields; determining a local foreground MV field and depth field for each pixel of the outputted image; defining a hole MV field based on the local foreground MV field; filter the hole MV field along its motion trajectory to reduce size of the one or more holes; and outputting a filtered image with one or more smaller holes.

8 Claims, 12 Drawing Sheets

(56) References Cited

OTHER PUBLICATIONS

Didyk, P. et al., "Adaptive Image-space Stereo View Synthesis," Proceedings of VMV 2010 : Vision, Modeling, and Visualization, Nov. 15, 2010, Siegen, Germany, 8 pages.
Scherzer, D. et al., "A Survey on Temporal Coherence Methods in Real-Time Rendering," Proceedings of the 32nd Annual Conference of the European Association for Computer Graphics, Eurographics 2011—State of the Art Reports, Apr. 11, 2011, Llandudno, UK, 26 pages.
Bowles, H. et al., "Iterative Image Warping," Computer Graphics Fourm, vol. 31, No. 2, May 2012, 10 pages.
He, K. et al., "Fast Guided Filter," ArXiv Cornell University Website, Available Online at https://arxiv.org/abs/1505.00996, May 5, 2015, 2 pages.
Schollmeyer, A. et al., "Efficient Hybrid Image Warping for High Frame-Rate Stereoscopic Rendering," IEEE Transactions on Visualization and Computer Graphics, vol. 23, No. 4, Apr. 2017, Available Online Jan. 25, 2017, 10 pages.
Yeh, R. et al., "Semantic Image Inpainting With Deep Generative Models," Proceedings of the 2017 IEEE Conference on Computer Vision and Pattern Recognition (CVPR), Jul. 21, 2017, Honolulu, Hawaii, 9 pages.
He, J. et al., "Hierarchical prediction-based motion vector refinement for video frame-rate up-conversion," Journal of Real-Time Image Processing, vol. 17, Mar. 30, 2018, 15 pages.

* cited by examiner

METHODS AND SYSTEMS FOR MOTION VECTOR FILTERING

FIELD

Embodiments of the subject matter disclosed herein relate to the field of three-dimensional (3D) computer graphics, and in particular to motion vector calculation, processing, and filtering.

BACKGROUND

Over the years, an increase in computer processing power has enabled real-time video rendering, for example for video games or certain animations, to become increasingly sophisticated. For example, whereas early video games featured pixelated sprites moving on a fixed background, contemporary video games feature photorealistic three-dimensional scenes filled with characters. Meanwhile, the miniaturization of processing components has enabled mobile devices, such as handheld video game devices and smartphones, to effectively support real-time rendering of high-frame rate, high-resolution video.

3D graphical video may be output in a variety of different framerates and screen resolutions. It may be desired to convert video with 3D graphics from one framerate (and/or resolution) to another framerate (and/or resolution). In order to save computational power while still increasing the framerate, interpolated frames can be used instead of rendering all frames within a video. Interpolated frames can be effectively generated through the use of motion vectors (also referred to herein as MVs), which track the difference in position of objects between the current frame (CF) and previous frame (PF).

BRIEF DESCRIPTION

In one example, a method comprises determining presence of one or more holes in an outputted image, wherein the outputted image was generated based on one or more motion vector (MV) fields and depth fields; determining a local foreground MV field and depth field for each pixel of the outputted image; defining a hole MV field based on the local foreground MV field; filter the hole MV field along its motion trajectory to reduce size of the one or more holes; and outputting a filtered image with one or more smaller holes.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 8:
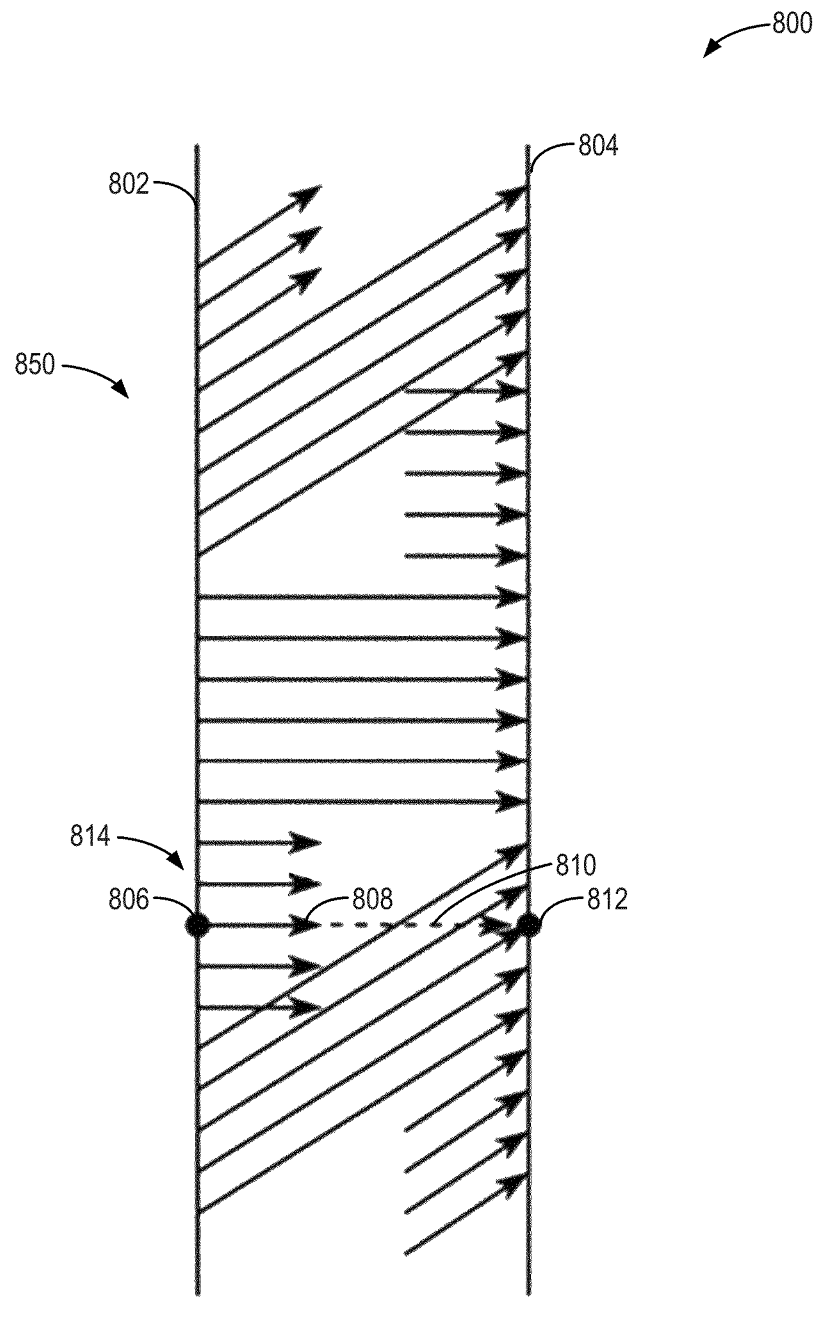
FIG. 8 shows a first diagram of a motion vector field.
Figure 9:
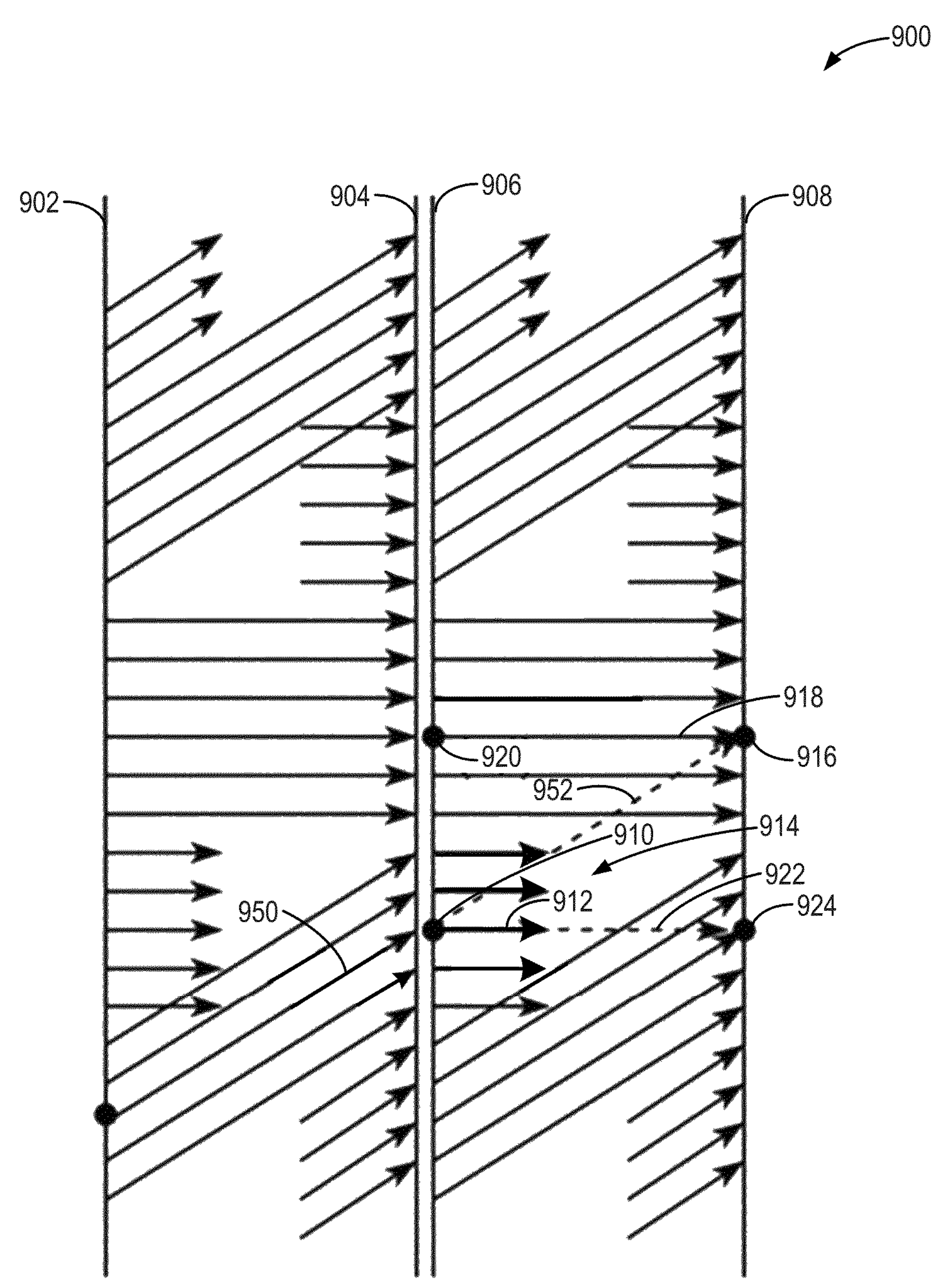
FIG. 9 shows second diagrams of a motion vector field.
Figure 10:
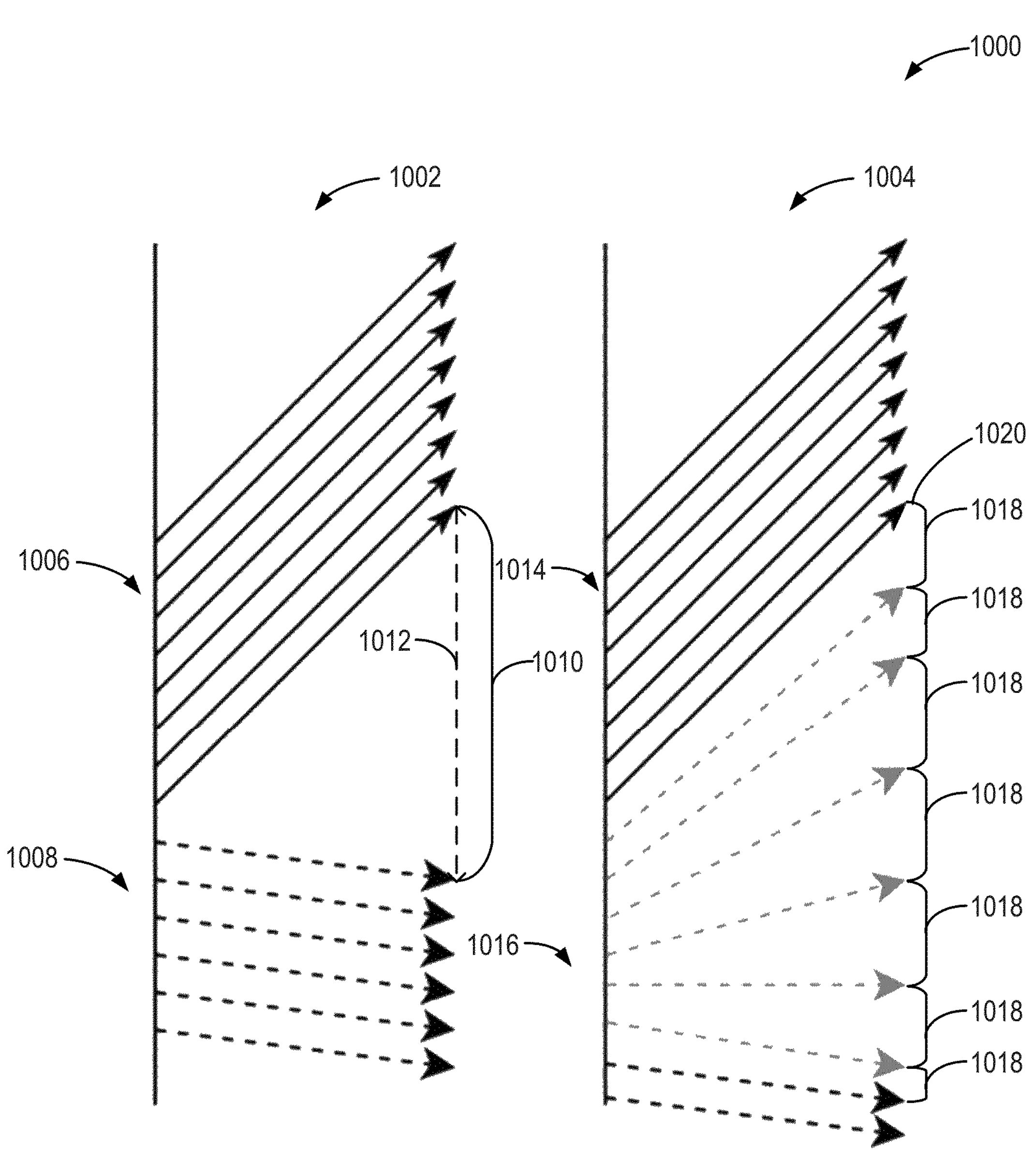
FIG. 10 shows a third diagram of an unfiltered motion vector field and a corresponding filtered motion vector field.

Systems and methods for calculating, processing, and filtering motion vector (MV) fields for use in frame interpolation, framerate conversion, reduction of hole filling, or other actions are described herein. A computing system equipped with an image processing system is depicted in a block diagram in FIG. 1. An exemplary image processing system is depicted in a block diagram in FIG. 2. A method for MV calculation, processing, and filtering is illustrated in a flowchart in FIG. 3. A method for MV calculation is illustrated in a flowchart in FIG. 4. A method for detection of foreground and background MVs is illustrated in a flowchart in FIG. 5. A method for MV processing is illustrated in a flowchart in FIG. 6. A method for MV filtering for reduction of hole filling is illustrated in a flowchart in FIG. 7. A first example diagram of an MV field is shown in FIG. 8. A second example diagram of an MV field is shown in FIG. 9. A third example diagrams of an MV field and a filtered MV field is shown in FIG. 10.

MV fields may be generated which track the difference in position of objects going forward in time, such as between a past frame (PF) and a current frame (CF). As explained herein, two types of MVs are generated, $MV_0$ represents motion from the PF to the CF and $MV_1$ represents motion from the CF to the PF. The MVs are generated for each pixel (or group of pixels, called a block) on the screen, forming an MV field, or collection of MVs for the pixels on the screen. As used herein, a field is defined to be a map from the collection of pixels in a frame to a collection of one or more numbers (e.g., components of a vector or single numbers).

If MVs are used in a framerate conversion process, typical rendering engines output only the $MV_1$ texture in two dimensions. As such, the texture contains no depth content, and only includes information about changes in relative screen positions as viewed in the reference frame of the virtual camera. Utilizing depth and foreground vs background information for the pixelwise MVs may inform how to compute the 2D components of block level MVs. Block level MVs may represent an average or weighted average of the MVs for a block of pixels (e.g., an eight by eight block of pixels) and may be utilized for frame interpolation or other image processing tasks in order to reduce processing demands. Block level MVs may be converted back to pixel level MVs to allow for other actions or uses based on virtual depths. Areas of the scene with certain relative ranges of depth are called foreground (close to the camera), background (far from the camera), and mid-range (between foreground and background).

As an example, two objects may be positioned at different distances from a virtual camera or viewpoint. If the two objects move in the same direction, in equal world-space distances, the object which is farther away may appear to move a smaller distance in the eye space, creating a parallax effect where objects which are farther away from the viewpoint appear to move less than objects that are closer to the viewpoint.

In addition, each frame may be composed of two kinds of objects: those with MVs and those without. Objects featuring MVs may include moving characters or other objects, the view (virtual camera position) of the user, and moving components of a user interface (for games, this may be a health bar, or other similar in-game graphic or statistic). Objects without MVs may include, for example, smoke effects, lighting effects, reflections, full- or partial-screen scene transitions (e.g., fades and wipes), and/or particle effects. By separating objects with MVs from objects without MVs, improved image processing can be performed. Traditionally, algorithms may attempt to exclude screen regions which feature objects without MVs. However, this approach is imperfect and may lead to blending of nearby objects during the process of framerate conversion and/or frame interpolation.

Rendering images on a computer system in real-time typically involves calculation and ordered blending of a plurality of virtual layers. Examples of such layers include a black background layer at the bottom, which may comprise a partially or completely black region on the screen. Applications and games may be drawn above the black background in order to be visible. Note that some layers may be opaque, fully transparent, or partially transparent. The transparency of the pixels within a given layer may be represented by its alpha mask. Above the internal components of the game/application, the graphical user interface (GUI) for the operating system may be drawn. Traditionally, the components of the operating system and the information from the game/application may be blended together from bottom to top. The blended image may be used directly for display.

Typical methods used for framerate conversion to increase display framerate other than frame interpolation also include extrapolation and reprojection. Reprojection is a general method for accelerating real-time rendering by reusing rendered pixels from adjacent frames. This includes taking one or more previously rendered frames and using newer motion information to extrapolate the previous frame into a prediction of what a normally rendered frame would look like. While useful, reprojection cannot produce a perfect output. For example, if previously hidden content is uncovered in a new frame, a hole will appear as a result of a lack of available pixel information in the source image. As an examples, when an object with MVs moves between a PF and a CF, background pixels may be uncovered from where the object was in the PF and no longer is in the CF. These pixel regions cannot be correctly filled by reprojection alone and therefore various inpainting algorithms exist to fill such holes, such as copying pixel values of the background texture to file the hole, selecting random neighboring pixels to fill the hole, applying a low-pass filtered intermediate image to fill the hole, etc. However, when the hole that is uncovered is large, the resulting output of the inpainting algorithm may appear unstable.

Similarly, extrapolation is a method for using existing data, for example MV and MVD data, to estimate future data. In image processing, and particularly in video game processing, MVs calculated between a PF and a CF may be used for extrapolation. As a result though, larger holes may appear in the resulting image.

Frame interpolation, as herein discussed, refers to the systematic process of generating one or more extra frames from the visual information of a previous frame PF and a current frame CF. The extra frames are called interpolated frames, or IFs. The IFs may be sequentially displayed between the PF and the CF, in some examples with uniform spacing between and in other examples with non-uniform spacing between. As an example, framerate conversion via frame interpolation may be used to generate one IF between every given pair of PF/CFs, resulting in an output with double the framerate of the original video. Generation of IFs may be desirable for their low computational cost, as generating more frames from the game engine itself may require a higher degree of computational complexity and therefore more processing power.

For video games, depth can be provided by the game engine at the pixel level and used for the block to pixel MV conversion. But additional information is typically demanded. For example, the depth for the object might not be correlated with the motion when there is a shadow on that object casted by another. In general, lighting, ray tracing, and other special effects that are applied in the game make the MVs unsuitable for frame interpolation and they must be replaced by the internally generated MVs. Such internally generated MVs then need to be converted from block level to pixel level. The depth provided by the game engine is also not suitable to convert MVs from block level to pixel level because the values thereof do not change when the MV changes.

To complete framerate conversion via one or all of frame interpolation, extrapolation, and reprojection, high-quality MVs and depth information may be obtained from the game engines, though this may result in consumption of more computational resource and more processing power. As herein described, a flexible architecture for frame interpolation is presented that allows for MVs to be calculated, processed, and filtered away from the game engines to reduce use of computational resources for image processing. In some examples, MV and depth information may be obtained from the game engine, called external MVs and depths, and/or, in other examples, estimated based on input images, called internal MVs and depths. External and internal MVs and depths may be used in conjunction and/or combined during processing and/or filtering to be used for frame interpolation. Internal virtual depth information may be generated according to internal block level MVs, thereby allowing for conversion of MVs from block level to pixel level.

By calculating and processing MVs, in terms of virtual depth, block level, and pixel level, extrapolation and frame interpolation may be completed. The methods and systems provided herein allow for MV calculation and processing at the block level based on obtained input images rather than from game engines. The methods and systems may include detection of foreground and background MVs, generation of virtual depth information, and conversion from block level to pixel level to allow for usage in processes such as extrapolation and frame interpolation. In examples in which extrapolation is performed, only one image may be outputted. When extrapolation is not performed, two or more images may be outputted and then merged into a single image.

Added depth information may offer additional flexibility for an image processing system. Depth components of the MVs may be used, for example, as an input to a weighting function. Depth is often more highly correlated with MVs than an actual image, even for a small area. It is possible to get a virtual depth of a scene, for example in a video game, by determining foreground and background MVs for a region. Virtual depths, when converted to pixel level, may allow for block level MVs to be converted to pixel level MVs and for frame interpolation to be performed more accurately by taking changes in depth into account. As referred to herein, MVs with depth information added are also known as MVDs (MVs with depth).

Further, MV filtering may comprise filtering MVs along motion trajectory and changing MVs of background near uncovered areas. Doing so may partition large uncovered holes that result from extrapolation and/or reprojection processes into smaller hole areas. The smaller hole areas may be filtered further to reduce the hole entirely or may be filled with inpainting algorithms which may mitigate any instability that may result from performing inpainting algorithms on large holes.

Aspects of the present disclosure are described herein with reference to flowchart illustration and/or block diagrams of methods, apparatus, and computer program products according to the embodiments disclosed herein. Insofar as such block diagrams, flowcharts, and/or examples contain one or more functions and/or operations, it will be understood by those of skill in the art that each function and/or operation within such block diagrams, flowcharts, or examples can be implemented, individually and/or collectively, by computer readable instructions using a wide range of hardware, software, firmware, or virtually any combination thereof. The described systems are exemplary in nature, and may include additional elements and/or omit elements. The subject matter of the present disclosure includes all novel and non-obvious combinations and sub-combinations of the various systems and configurations, and other features, functions, and/or properties disclosed. Thus, the methods may be performed by executing stored instructions on machine readable storage media with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Figure 1:
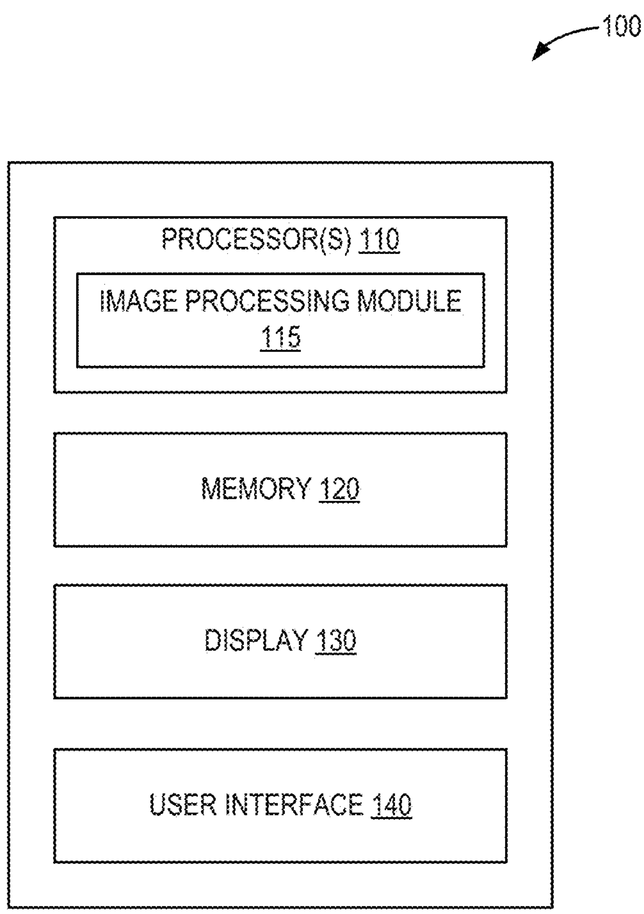
FIG. 1 shows a block diagram of an example computing system.

FIG. 1 schematically depicts an example of a computer system 100 which may include one or more processors 110, volatile and/or nonvolatile memory 120 (e.g., random-access memory (RAM) and/or one or more hard disk drives (HDDs)). The processors 110 may comprise one or more central processing units (CPUs), GPUs, and/or one or more image processing systems, such as image processing system 115. The computer system may also include one or more displays 130, which may comprise any number of visual interface technologies. In addition, example embodiments may include a user interface 140, e.g., keyboards, computer mice, touch screens, controllers, etc. to allow users to provide input to the computer system. In some embodiments, the computer system may be a mobile phone or tablet. The disclosure herein refers primarily to systems describing the transmission of data within the processors 110. Data transmission within the processors may include the data generated by the CPUs/GPUs and transmitted to the image processing system 115, or vice versa. Note that the image processing system 115 may be hardware units external to the CPUs/GPUs or may be programs operating within the CPUs/GPUs.

As used herein, the terms "system" or "module" may include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. Various modules or units shown in the attached figures may represent the hardware that operates based on software or hardwired instructions, the software that directs hardware to perform the operations, or a combination thereof.

It should be noted that the techniques discussed herein apply not only to games, but to any animated renderings of 3D models, though the advantages offered by this method may be most noticeable in real-time rendering situations.

Figure 2:
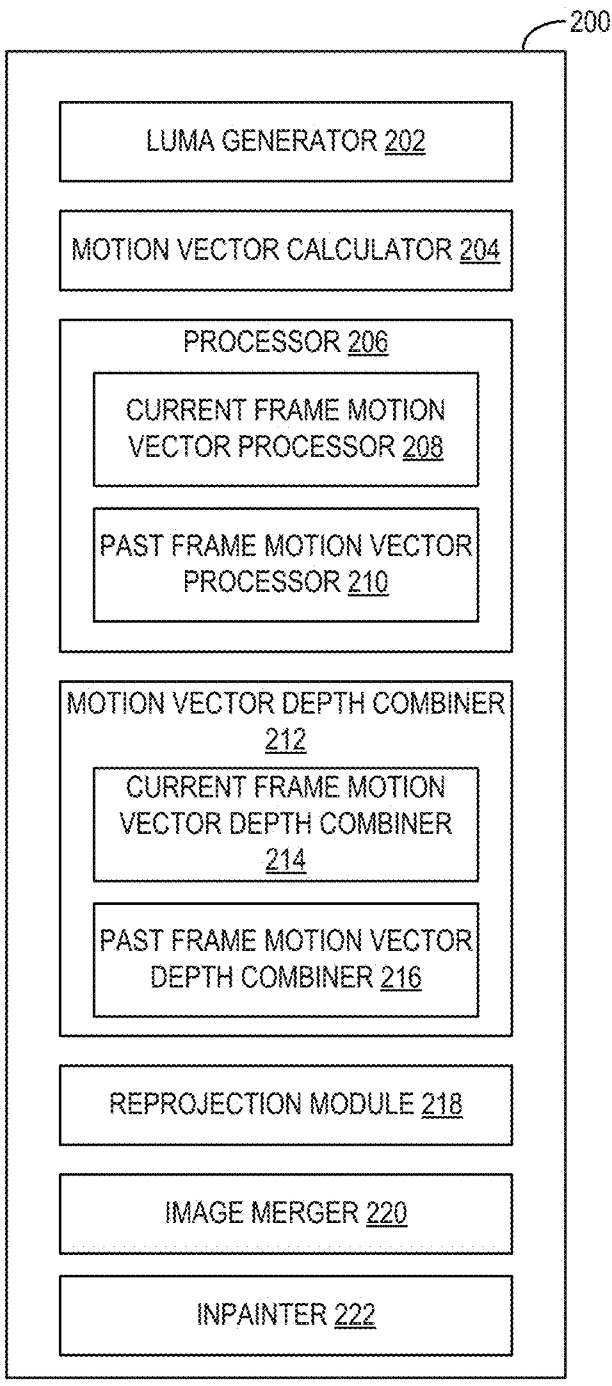
FIG. 2 shows a block diagram of an example image processing system.

FIG. 2 shows a block diagram of an image processing system 200. The image processing system 200 may be included as part of or otherwise communicatively coupled to the computer system 100 of FIG. 1. In some examples, the image processing system 200 may be the image processing system 115 of the processor 110. In other examples, the image processing system 200 may be separate from the image processing system 115 of the processor 110.

The image processing system 200 may comprise a plurality of modules to perform various functions and/or to store instructions executable by a processor in memory. The image processing system 200 may comprise a luma generator 202, an MV calculator 204, an MV processor 206, an MV depth combiner 212, a reprojection module 218, an image merger 220, and an inpainter 222, which each perform or store instructions executable to perform various tasks for MV calculation, processing, and/or filtering. In some examples, not all of the modules herein described may be included in the image processing system 200.

The luma generator 202 may generate luma images for two successive frames, for example a PF and a CF. Luma images may refer to a luma component of an image, wherein the luma component is a y-component, y-channel component, or Y'CbCr. The luma generator 202 may obtain input images as PF and CF and generate from the input images the luma images. MV calculation, and thereby the MV calculator 204, may use luma of images as input. If the input images is in red-green-blue (RGB), color space conversion is demanded to obtain the luma image, as may be performed by the luma generator 202.

As described previously, for some applications, like video games, external MVs may be used for background and mask for object and special effect (e.g., fogs, shadows, etc.). From this, luma images may be generated and/or modified based whether a pixel belongs to an object, a special effect, or other. For example, if a current pixel belongs to an object, output luma image may be generated based on equation (1):

$$YO_{(i,j)} = YI_{(i,j)} * k_0 + thr_0 \quad (1)$$

where YO is output luma image, YI is input luma, (i, j) is the pixel position, $k_0$ is the weight for the input luma value and $thr_0$ is change to the luma value based on the classification of the pixel as an object.

If a current pixel belongs to special effects, output luma image may be generated based on equation (2):

$$YO_{(i,j)} = YI_{(i,j)} * k_1 + thr_1 \quad (2)$$

where the variables are as described above. Further, if the current pixel belongs to another type of pixel other than object or special effect, output luma image may be generated based on equation (3):

$$YO_{(i,j)} = YI_{(i,j)} * k_2 + thr_2 \quad (3)$$

where the variables are as described.

In some examples, pixel value of a luma image may be measured as a range from 0 to r and a typical value of $k_0$ is 0.5, $k_1$ is 0.4, $k_2$ is 0.4, $thr_0$ is half of r, $thr_1$ is 0, and $thr_2$ is 0. The k and thr values may be used to tune the performance of the system. They may also be included as meta data that allows them to be optimized for particular games. In some instances, some areas of pixels may use internal MVs (e.g., iMVs) and some areas of pixels may use external MVs (e.g., eMVs). In cases where both iMVs and eMVs are used, a hybrid MV (e.g., hMV) may result. Modification of luma images as described above may allow for a more accurate MV for an hMV case.

The MV calculator 204 may calculate or store instructions executable to calculate MV and perform MV correction according to the generated luma images. MVs, as will be described further, may be calculated between PF and CF for a given pixel. For a pixel at position (i, j) in PF that moves to position (u, v) in CF, the motion at position (i, j) of PF is (u−i,v−j) pixels, and the motion at position (u, v) of CF is (u−i, v−j) pixels too.

In some examples, the MV calculator 204 may calculate MVs as block level rather than pixel level, as described above. Blocks may be square, rectangle or other groups of pixels, e.g., 8×8 pixels, 4×4 pixels, or the like. Each block may be defined by a position or pixel at which it is centered. MVs may be calculated for blocks based on center position in PF and CF in a similar fashion as described above. The MV calculator 24 may generate MV fields based on calculated MVs for a plurality of blocks within an input image.

Further, the MV calculator 204 may generate regional foreground MVs and regional background MVs. In some examples, an input image or luma image may be partitioned into H*V regions where H represents the number of regions in the horizontal direction and V represents the number of regions in the vertical direction. Foreground MVs and background MVs may be generated for each region with overlapped windows. In some examples, a ratio between dimensions of block regions may approximate an aspect ratio of the image.

The MV processor 206 may comprise a current frame MV processor 208 and a past frame MV processor 210. The current frame MV processor 208 may process MVs for the CF and the past frame MV processor 210 may process MVs for the PF. Both the current frame MV processor 208 and the past frame MV processor 210 may output pixel level MVs and pixel level virtual depths by filtering block level MVs, generating block level virtual depths, and decomposing block level MVs and depth into pixel level MVs and depth. Having both the current and past frame MV processors 208, 210 included allows MVs for phase 0 vs phase 1 to be processed separately.

The MV depth combiner 212 may comprise a current frame MV depth combiner 214 and a past frame MV depth combiner 216. The MV depth combiner 212 may combine or store instructions executable to combine iMVs and internal depth with eMVs and external depths according to marked objects and special effects in past frame (e.g., via the past frame MV depth combiner 216) and/or in a current frame (e.g., via the current frame MV depth combiner 214).

The architecture of the image processing system 200 may be flexible in that it responds to and meets performance demands of a coupled computing system and/or game engine. As such, MVs may be obtained from the game engine as eMVs and depths or estimated based on obtained images as iMVs and depths. In some examples, if performance demands of the game engine are higher, the image processing system 200 may compensate by using more iMVs and depths to reduce processing demands of the game engine. As combinations of eMVs and iMVs are also supported by the image processing system 200, the MV depth combiner 212 may combine these two sets of information accord to masks. The masks may include mask information for object, shadow, and special effect. For areas whose motion may not be expressed with eMVs, such as object, shadow and special effect, iMV calculation may generate iMVs for these areas.

The reprojection module 218 may perform or store instructions executable to perform reprojection on input images from time t (e.g., time of past frame) to new temporal position t+p (or from time t+1 to time t+p, where p<=1) according to calculated MVs, depth, and phase values, the phase value is p when from time t to t+p (or phase value is p−1 when from time t+1 to time t+p), here assume that the time difference between adjacent frames is 1. In some examples, the reprojection module 218 may comprise a current frame reprojection module and a past frame reprojection module similar to the MV depth combiner 212 and the MV processor 206, wherein calculated and processed MVs of PFs are reprojected via the past frame reprojection module and calculated and processed MVs of CFs are reprojected via the current frame reprojection module. In some examples, the reprojection module 218 may include instructions stored in memory to filter obtained MVs along a motion trajectory to reduce holes uncovered during reprojection.

The image merger 220 may obtain reprojected images and merge them together. Again, the image merger 220 may obtain, from respective reprojection modules, reprojected images of past frames and reprojected images of current frames and may merge them together.

The inpainter 222 may include one or more inpainting algorithms or store instructions to execute one or more inpainting algorithms. The one or more inpainting algorithms may be configured to perform hole filling for pixel positions not reprojected by the reprojection module 218. As described previously, when previously hidden content is uncovered in a new frame, a hole will appear as a result of a lack of available color information in the source image. As an examples, when an object in the foreground with MVs moves between a PF and a CF, background pixels may be uncovered from where the object was in the PF and no longer is in the CF. These pixel regions cannot be correctly filled by reprojection alone and the inpainter 222 may fill the holes via the one or more inpainting algorithms. In some examples, the processing and filtering of the MVs as executed by the image processing system 200 may reduce a size of the holes, as will be further described below.

Figure 3:
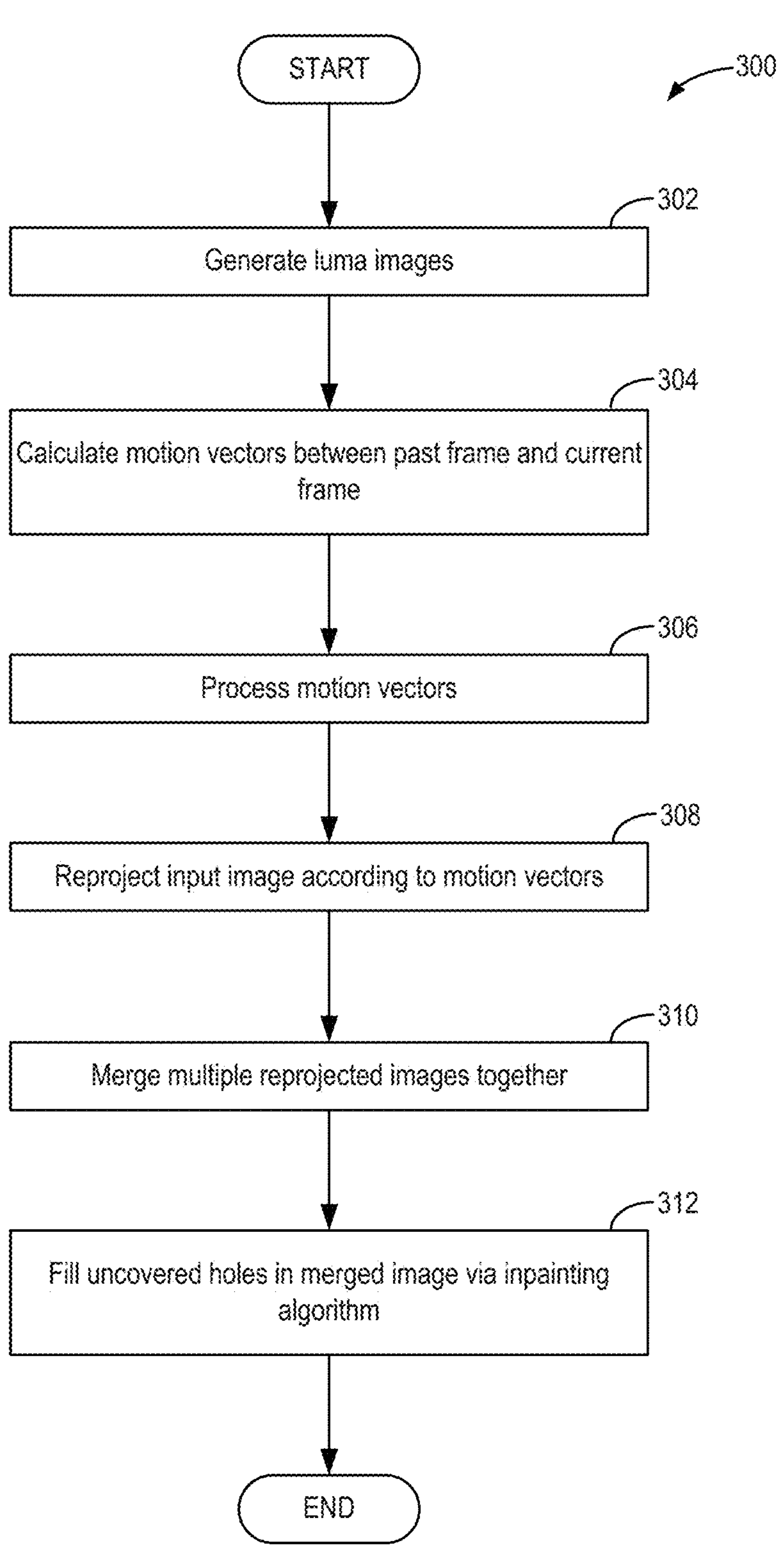
FIG. 3 shows a flowchart illustrating a method for motion vector calculation, processing, and filtering.

Turning now to FIG. 3, a flowchart illustrating a method 300 for MV calculation, processing, and filtering is shown. The method 300 may be carried out using the systems and components described herein above with regard to FIGS. 1-2. For example, the method 300 may be carried out by one or more processors according to instructions stored in memory. For example, instructions may be stored and executed by an image processing system, such as the image processing system 200. The image processing system herein described may be part of or otherwise communicably coupled to a computer system, such as computer system 100, which includes game engines (e.g., GPUs, CPUs, etc.).

At 302, method 300 includes generating luma images as input. In some examples, images may be obtained and processed to output luma images, as is described above. The luma images may contain a plurality of pixels at particular positions. As described previously, for some applications, like video games, external MVs may be used for background and mask for object and special effect (e.g., fogs, shadows, etc.). From this, luma images may be generated and/or modified based whether a pixel belongs to an object, a special effect, or other, based on equations (1), (2), and (3) defined above. The luma images may comprise a PF and a CF, in some examples.

At 304, method 300 includes calculating MVs between the PF and the CF. MVs may be calculated for a particular pixel or block at a defined position in one of the PF and the CF. The MV may be calculated for that pixel from the PF to the CF or from the CF to the PF. An MV field may be generated as well that includes a plurality of MVs between frames. Calculation of MVs as at 304 may include, in some examples, foreground and background MV detection. Further, MV calculation may include calculating motion and quality of MV, which includes calculation of a sum of absolute difference (SAD) and a difference between a MV of a current block and an MV of the block pointed to by the current block (MVDIFF). MV calculation, including quality determination and detection of background and foreground MVs is further described with respect to FIGS. 4 and 5. In some examples, MVs may also be calculated between a past of past frame (PPF) and the PF, as will be further discussed with respect to FIG. 5.

At 306, method 300 includes processing the MVs. As will be further described with respect to FIG. 6, processing the MVs may include MV post-filtering, generation of virtual depths, and block level MV decomposition. MV post-filtering may be based on the MV quality as determined at 304. MV processing may output block level or pixel level MVs with depth information, as may be used for frame interpolation. In some examples, processing the MVs may comprise filtering along a motion trajectory to reduce size of holes uncovered between the PF and the CF.

At 308, method 300 includes reprojecting an input image according to MVs. In some examples, block level MVs and corresponding pixel level MVs may be obtained. The virtual depth information as well as phase values for the MVs may be obtained and/or determined and the input image may be rendered based on the depth and phase values. Phase values may refer to a temporal distance between the rendered image and an original input image.

At 310, method 300 includes merging multiple rendered images together. In some examples, when interpolating, the PF is projected forward from a time t to a time t+p and its phase value is p, where the p is between 0 and 1. While the CF is projected backwards from time t+1 to time t+p and its phase value is p−1. This results in two images that are to be merged to create a final image. In other examples, such as when using extrapolation, the $MV_1$ fields of CF may be projected forward from time t+1 to a time t+1+p, in which case only one image may be generated and merging may be skipped. In some examples, one or more areas in the merged images may include pixels/blocks without data as movement of pixels according to the MVs are uncovered.

At 312, method 300 includes filling uncovered holes in the merged image via an inpainting algorithm. In some examples, an inpainting algorithm may be applied to the merged images directly, such as inpainting algorithms that copy background texture surrounding the holes, select random neighboring pixels, and/or use lowpass filtered intermediate images to fill holes. In other examples, such as will be further described below, MVs may be filtered along the motion trajectory and MVs of background pixels/blocks near the uncovered areas may be changed to divide uncovered holes into smaller holes, as mentioned at 306. In some examples, an inpainting algorithm may then be applied to the smaller holes. In other examples, MV filtering to reduce holes may be repeated one or more second times until the holes are essentially eliminated.

The method 300 may allow for processed and filtered MVs that may be used for frame interpolation or other image processing including extrapolation and reprojection. The processed and filtered MVs may be generated in a more flexible manner that allows for usage of both iMVs and eMVs based on the demands of the GPU/CPU. Inclusion of internally estimated and/or calculated MVs may allow for lower computational and/or processing power as compared to eMVs. Further, holes that are generated during image processing like reprojection and/or extrapolation, may be filed by filtering the MVs.

Figure 4:
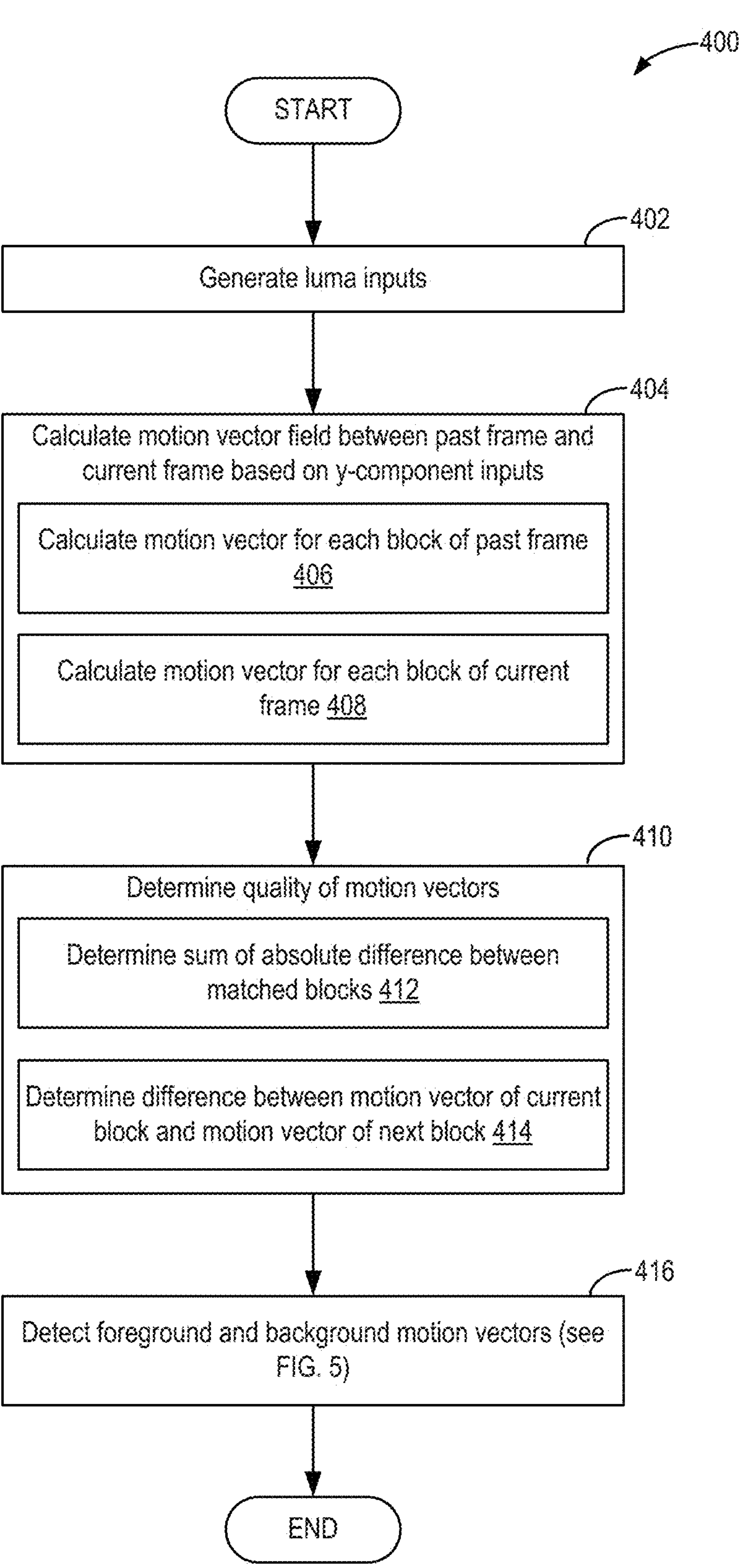
FIG. 4 shows a flowchart illustrating a method for motion vector calculation.

Turning now to FIG. 4, a flowchart illustrating a method 400 for calculating MVs is shown. The method 400 may be carried out using the systems and components described herein above with regard to FIGS. 1-2. For example, the method 400 may be carried out by one or more processors according to instructions stored in memory. For example, instructions may be stored and executed by an image processing system, such as the image processing system 200. The image processing system herein described may be part of or otherwise communicably coupled to a computer system, such as computer system 100, which includes game engines (e.g., GPUs, CPUs, etc.). Method 400 may be incorporated into method 300 of FIG. 3, specifically at 302.

At 402, method 400 includes generating luma inputs. As is described above with respect to FIG. 2, luma images may be generated for two successive frames (e.g., PF and CF). Luma inputs may be generated and/or modified based on whether a pixel belongs to an object, a special effect, or other, based on equations (1), (2), and/or (3). For example, for a current pixel that belongs to an object, output luma image may be generated based on equation (1), for a current pixel that belongs to special effects, output luma image may be generated based on equation (2), and for a current pixel that belongs to a type of pixel other than object or special effect, output luma image may be generated based on equation (3).

In some instances, some areas of pixels may use internal MVs (e.g., iMVs) and some areas of pixels may use external MVs (e.g., eMVs). In cases where both iMVs and eMVs are used, a hybrid MV (e.g., hMV) may result. Modification of luma images as described above may allow for a more accurate MV for an hMV case.

At 404, method 400 includes calculating MVs between PF and CF based on the luma input images. A plurality of calculated MVs between the PF and the CF at different positions may together form an MV field. Calculating MVs may include calculating MVs for each block of the PF, as noted at 406, and calculating MVs for each block of the CF, as noted at 408. In some examples, as previously described, blocks of pixels may be defined for the CF and the PF. For example, blocks of 8×8 pixels may be used, however blocks of other sizes and shapes are possible.

Each block for a luma image may have a defined position. As an example, for a block (m, n) with a block size of b×b, a top left position of the block may be [b*m, b*n] and a bottom right position of the block may be [b*m+b−1, b*n+b−1]. The center position of the block may be proportional to (m, n), in some examples.

As an example, for a block (m,n) in PF with a MV [$y_{mn}$, $x_{mn}$], its top left position moves from first position [m*b, m*b] in the PF to a second position [m*b+$y_{mn}$, n*b+$x_{mn}$] in the CF. The MV in CF has the same polarity with that in PF, if the MV of block (c, d) in CF is [$y_{cd}$, $x_{cd}$], then its top left position moves from position [c*b, d*b] in CF to position [c*b−$y_{cd}$, d*b−$x_{cd}$] in PF.

At 410, method 400 includes determining quality of the calculated MVs. In some examples, calculation of MVs may incorporate determination of various values, including but not limited to a horizontal motion component, a vertical motion component, a sum of absolute differences (SAD) between matched blocks, as noted at 412, and a difference between an MV of a block and an MV of a block pointed to by the block (MVDIFF), as noted at 414.

For a block (c,d) in CF with a MV [$y_{cd}$, $x_{cd}$], the SAD for block (c,d) is:

$$iBMV_{CF1(c,d)}\cdot sad = \sum\nolimits_{i=0;j=0}^{i<b;j<b}\left|I_{CF}(c*b+i,\ d*b+j)-I_{PF}(c*b-y_{cd}+i,\ d*b-x_{cd}+j)\right|.$$

And for a block (m,n) in PF with a MV [$y_{mn}$, $x_{mn}$], the SAD for block (m,n) is:

$$iBMV_{PF0(m,n)}\cdot sad = \sum\nolimits_{i=0;j=0}^{i<b;j<b}|I_{PF}(m*b+i,\ n*b+j)-I_{CF}(m*b+y_{mn}+i,\ n*b+x_{mn}+j)|.$$

In some examples, smaller SAD values indicate good matching between the blocks and larger SAD values indicate poor matching.

MVDIFF may indicate whether the block (m, n) is in a covered or uncovered region. Small MVDIFFs indicate that the MV of the PF is confirmed by the opposing MV of the CF, and as such may not be in a covered/uncovered region. Large MVDIFFs indicate that the block is in a covered/uncovered region such that the current MV is not confirmed by the opposing MV of the CF. For $MV_0$, a large MVDIFF may indicate that the block is in a covered region. For $MV_1$, a large MVDIFF may indicate that the block is in an uncovered region. MVDIFF for block (m,n) of the PF may be determined by equation (4):

$$iBMV_{PF0(m,n)}\cdot mvdiff = |iBMV_{P0(m,n)}\cdot x - iBMV_{CF1(c\prime,d\prime)}\cdot x| + |iBMV_{PF0(m,n)}\cdot y - iBMV_{CF1(c\prime,d\prime)}\cdot y| \quad (4)$$

Where $$c' = \frac{m*b + iBMV_{PF0(m,n)}\cdot y + \frac{b}{2}}{b},\ d' = \frac{n*b + iBMV_{PF0(m,n)}\cdot x + \frac{b}{2}}{b}$$

and $iBMV_{PF0(m,n)}$.mvdiff is the MV field of the PF for block (m, n), $iBMV_{PF0(m,n)}$.x is the horizontal motion and $iBMV_{PF0(m,n)}$.y the vertical motion thereof, and $iBMV_{CF1(c',d')}$.x is the horizontal motion and $iBMV_{CF1(c',d')}$.y the vertical motion of the MV field of the CF for block (c', d').

MVDIFF for blocks (c, d) of the CF may be determined by equation (5):

$$iBMV_{CF1(c,d)}\cdot mvdiff = |iBMV_{CF1(c,d)}\cdot x - iBMV_{PF0(m',n')}\cdot x| + |iBMV_{CF1(c,d)}\cdot y - iBMV_{PF0(m',n')}\cdot y| \quad (5)$$

Where $$m' = \frac{c*b - iBMV_{CF1(c,d)}\cdot y + \frac{b}{2}}{b},\ n' = \frac{d*b - iBMV_{CF1(c,d)}\cdot x + \frac{b}{2}}{b}$$

and $iBMV_{CF1(c,d)}$.mvdiff is the MV field of the CF for block (c, d), $iBMV_{CF1(c,d)}$.x is the horizontal motion and $iBMV_{CF1(c,d)}$.y the vertical motion thereof, and $iBMV_{PF0(min)}$.x is the horizontal motion and $iBMV_{PF0(m',n')}$.y the vertical motion of the MV field of the PF for block (m', n').

Turning briefly to FIG. 8, a first diagram 800 of an MV field is shown. The first diagram 800 demonstrates MVDIFF calculation as described at 414 of method 400. A first line 802 represents internal block level phase 0 MV field of PF (e.g., $iBMV_{PF0}$) and a second line 804 represents internal block level phase 1 MV field of CF (e.g., $iBMV_{CF1}$). A plurality of block level MVs 850 are represented as arrows between the first line 802 and the second line 804. For example, for a first block 806 (e.g., first block (m, n)), a MV of the first block 806 is represented by arrow 808. The first block 806 may be included in a covered area 814 such that the MV thereof is not valid all the way to the CF. For covered areas where MVs are not valid all the way to respective next frame, MVDIFF may be large. Smaller MVDIFFs may result when the MV is valid to the respective next frame.

In order to determine MVDIFF and whether a block is in a covered or uncovered region, MV projection may be performed to project the MV to hit its next block. MV projection may be performed from the $iBMV_{PF0(m,n)}$ to second block 812 (e.g., second block (c', d') in $iBMV_{CF1}$). The second block may be determined based on equations (6):

$$c' = \frac{m * b + iBMV_{PF0(m,n)} \cdot y + \frac{b}{2}}{b} \quad (6)$$

$$d' = \frac{n * b + iBMV_{PF0(m,n)} \cdot x + \frac{b}{2}}{b} \quad (6)$$

where the variables are as explained above. The MV from CF to PF may then be calculated based on the position of the second block. The resultant positions of c' and d' and the MV from CF to PF may then be used to calculate MVDIFF, as described with respect to equation (4) above. If the calculated MVDIFF is large, the first block is in a covered region. Dashed line 810 represents a set of phases where the MV is not valid due to the first block being covered. Determination of the MVDIFF as herein described allows for determination of whether the first block is covered or uncovered.

Returning to FIG. 4, at 416, method 400 includes detecting foreground and background MVs. As will be further described with respect to FIG. 5, detection of foreground and background MVs may be a four MV fields-based algorithm. In addition to the MV fields between PF and CF (e.g., $iBMV_{PF0}$ and $iBMV_{CF1}$), block level MV fields between a PPF and PF (e.g., $iBMV_{PP0}$ and $iBMV_{PF1}$) may be used to determine foreground and background MVs. It should be understood that calculation of block level MV fields between the PPF and the PF may simply be a previously calculated block level MV field, for example between a PF and a CF delayed by one frame from the currently being calculated frames. By comparing SAD and MVDIFF values, occluded areas may be found and if so, local foreground and background MVs may be detected. Occluded areas, as herein described, may be areas in which a moving object either covers something that was previously uncovered or uncovers background that was previously covered.

MV fields, as herein calculated including foreground and background information, may be processed, as will be further described below, to generate virtual depths. Virtual depths allow for rendering of images for frame interpolation.

Figure 5:
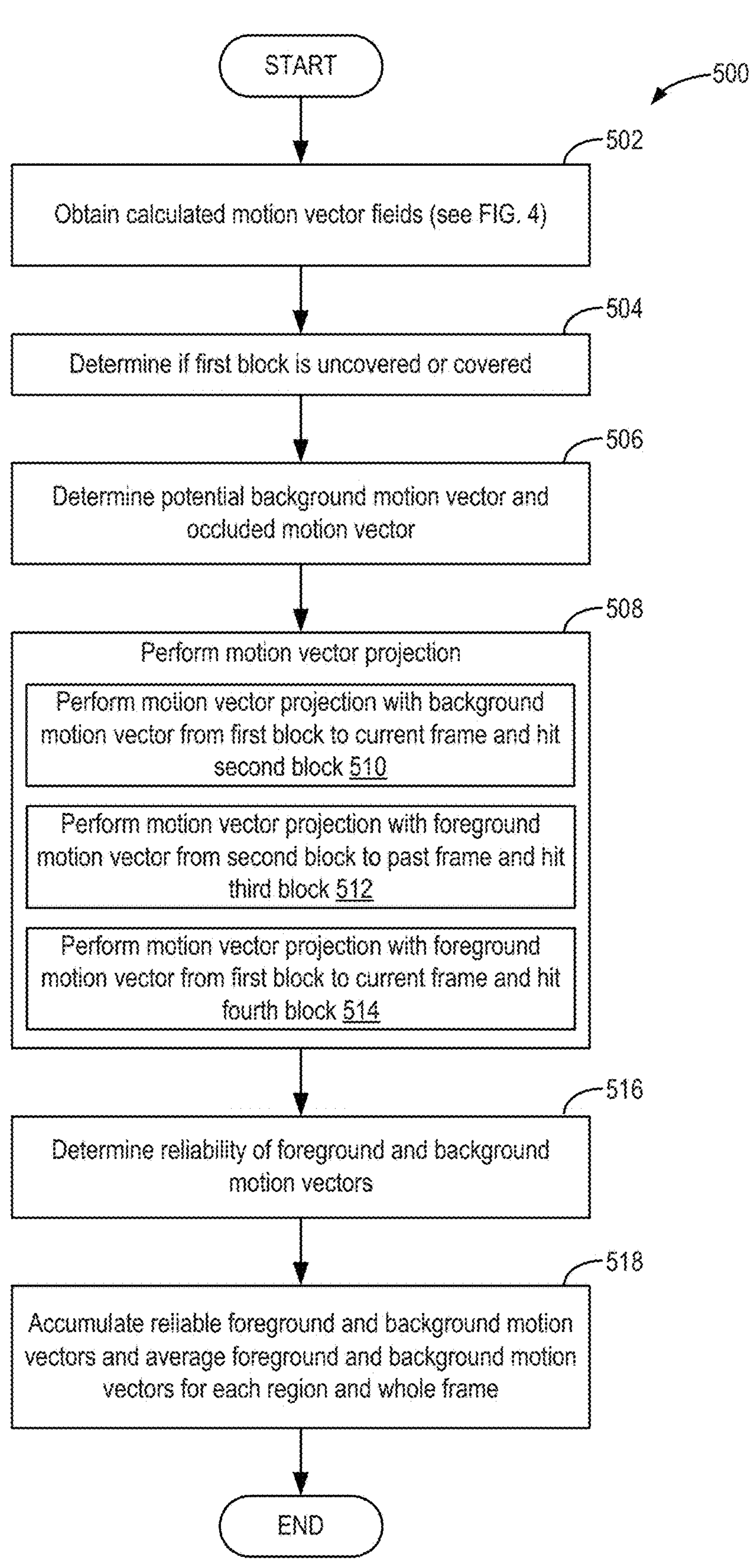
FIG. 5 shows a flowchart illustrating a method for regional foreground and background motion vector detection.

Turning now to FIG. 5, a flowchart illustrating a method 500 for detecting foreground and background MVs is shown. The method 500 may be carried out using the systems and components described herein above with regard to FIGS. 1-2. For example, the method 500 may be carried out by one or more processors according to instructions stored in memory. For example, instructions may be stored and executed by an image processing system, such as the image processing system 200. The image processing system herein described may be part of or otherwise communicably coupled to a computer system, such as computer system 100, which includes game engines (e.g., GPUs, CPUs, etc.). Method 500 may be incorporated into method 400 of FIG. 4, specifically at 416.

At 502, method 500 comprises obtaining MVs for a first block (e.g., block (m, n)). It should be understood that the first block (m, n) representative of each block of an input image and the method 500 may be performed for one or more of the blocks of the input image, either sequentially or simultaneously. As described with respect to FIG. 4, MV fields may be obtained between a PF and a CF and between the PF and a PFF. MV fields between the PF and the CF may comprise MVs for each block of the PF (e.g., internal block level phase 0 MV of PF, or $iBMV_{PF0}$) and for each block of the CF (e.g., internal block level phase 1 MV of CF, or $iBMV_{CF1}$). MV fields between the PPF and the PF may comprise MVs for each block of the PPF (e.g., internal block level phase 0 MV of PPF, or $iBMV_{PP0}$) and for each block of the PF (e.g., internal block level phase 1 MV of PF, or $iBMV_{PF1}$). As MVs are calculated for each block of the PF, CF, and PPF, MVs for the first block (m, n) may be obtained. Further, obtaining MVs for the first block (m, n) may comprise obtaining SAD and MVDIFF values for that block, as they are calculated during calculation of MVs, as described with respect to FIG. 4.

At 504, method 500 includes determining whether the first block (m, n) is covered or uncovered. If MVDIFF for $iBMV_{PF0}$ (e.g., MV field between PF and CF for (m, n) of PF) is larger than MVDIFF for $iBMV_{PF1}$ (e.g., MV field between PPF and PF for (m, n) of PF), the first block (m, n) may be a potentially covered block. If MVDIFF for $iBMV_{PF0}$ is smaller than MVDIFF for $iBMV_{PF1}$, the first block (m, n) may be a potentially uncovered block.

At 506, method 500 includes determining potential background MV and occluded MV. Determination of potential background MV and occluded MV is based on whether the first block is covered or uncovered, as determined at 504. If the first block (m, n) is covered, as an example, then the MV field between PPF and PF for the first block (e.g., $iBMV_{PF1}$) may be set as the background MV, for example as is noted in equations (7) and (8):

$$MV_{BG} = iBMV_{PF1(m,n)} \quad (7)$$

$$MV_{occ} = iBMV_{PF0(m,n)} \quad (8)$$

wherein $MV_{BG}$ is background MV and $MV_{occ}$ is occluded MV.

At 508, method 500 includes performing MV projection. MV projection may be performed with the background MV from the first block (m, n) to the CF (e.g., internal block phase 1 of CF) for the first block (m, n), as noted at 510. The MV projection may hit second block (u, v) in order to obtain a potential foreground. MV projection may be performed based on equation (9):

$$MV_{FG} = iBMV_{CF1(u,v)} \quad (9)$$

where $MV_{FG}$ is the foreground MV and $iBMV_{CF1(u,v)}$ is the MV field between PF and CF of CF for second block (u, v).

Then, MV projection may be performed with the foreground MV from the second block (u, v) to the PF (e.g., internal block phase 0 of PF), as noted at 512. The MV projection may hit a third block (s, t). MV projection for the third block (s, t) may be based on equation (10):

$$MV_{FG_{DC}} = iBMV_{PF0(s,t)} \quad (10)$$

where $MV_{FG_{DC}}$ is the hit MV for the foreground and $iBMV_{PF0(s,t)}$ is internal block phase 0 MV of PF for third block (s, t).

Then, MV projection may be performed with the foreground MV from the first block (m, n) to the CF (e.g., internal block phase 1 MV of CF), as noted at 514. MV projection may hit fourth block (p, q). MV projection for the fourth block (p, q) may be based on equation (11):

$$MV_{BG_{DC}} = iBMV_{CF1(p,q)} \tag{11}$$

where $MV_{BG_{DC}}$ is the hit MV for the background and $iBMV_{CF1(p,q)}$ is internal block phase 1 MV of CF for the fourth block (p, q).

MV projection may be performed for each of the blocks of respective input image frames. As herein described, MV projection may provide for potential foreground and background MVs, via the equations (9), (10), and (11). The foreground and background MVs may be global and/or regional.

Turning briefly to FIG. 9, a second diagram 900 is shown illustrating MV projection for detection of foreground and background MVs as described at 508, 510, 512, and 514 of method 500. The second diagram 900 includes a first line 902 representing internal block level phase 0 MV field of PPF (e.g., $iBMV_{PP0}$), a second line 904 representing internal block level phase 1 MV field of PF (e.g., $iBMV_{PF1}$), a third line 906 representing internal block level phase 0 MV field of PF (e.g., $iBMV_{PF0}$), and a fourth line 908 representing internal block level phase 1 MV field of CF (e.g., $iBMV_{CF1}$). A plurality of block level MVs are represented as arrows between the first line 902 and the second line 904 and between the third line 906 and the fourth line 908.

A first block 910 (e.g., the first block (m, n)) of PF may be a covered block. The internal block phase 1 MV of the PF of the first block 910 may be represented by line 950. As described with respect to method 500, the internal block phase 1 MV of the PF of the first block (m, n) (e.g., $iBMV_{PF1(m,n)}$) may be set as the potential background MV, e.g., $MV_{BG}$, as described by equation (7) above, and the internal block phase 0 MV of the PF of the first block (m, n) may be an occluded MV (e.g., $MV_{occ}$) when the first block (m, n) is in a covered region 914, as described by equation (8) above. The occluded MV may be represented by a first arrow 912.

MV projection from the first block 910 to a second block 916 may be represented by first dashed arrow 952 in the second diagram 900. The first dashed arrow 952 may be the internal block level phase 1 MV of the CF of the second block 916, which as described with respect to equation (9), may be a foreground MV (e.g., $MV_{FG}$).

MV projection may then be performed from the second block 916 to a third block 920 (e.g., third block (s, t)). The MV that results from the MV projection from the second block 916 to the third block 920 is represented in the second diagram 900 by second arrow 918. The MV represented by the second arrow 918, when of the PF, may be a dc foreground MV (e.g., $MV_{FG_{DC}}$), as described by equation (10) above.

MV projection may also be performed from the first block 910 to a fourth block 924 (e.g., fourth block (p, q)). Similar to as described with respect to FIG. 8, the internal block level phase 0 MV of PF for the first block 910 may not be valid all the way to the fourth block 924. MV projection may be performed to reach the fourth block 924. Second dashed arrow 922 may represent the MV resultant from the MV projection. The resultant MV may be the internal block level phase 1 MV of CF of the fourth block 924, which as described by equation (11) above, may be the dc background MV (e.g., $MV_{BG_{DC}}$).

Each of the foreground and background MVs determined via MV projection as described by method 500 and illustrated in the second diagram 900 may be potential MVs. Some of the potential MVs may be reliable and some may not be reliable.

Returning to FIG. 5, at 516, method 500 includes determining the reliability of the foreground and background MVs. Determining reliability of the foreground and background MVs may include defining previous global foreground MV and previous global background MV as well as previous regional foreground MV and previous regional background MV. The previous regional foreground and background MVs may be relative to the region to which the first block (m, n) belongs. Each of the previous foreground and background MVs, including respective globals and regionals, may be defined according to horizontal motion and vertical motion. Further, deltas (e.g., distances in pixels between where two MVs are pointing to) between MVs may be determined for the foreground and background MVs with respect to horizontal and vertical motion, for example as described in equation (12) for the foreground MV:

$$mvdist_{FG} = |MV_{FG}\cdot x - MV_{FG_{DC}}\cdot x| + |MV_{FG}\cdot y - MV_{FG_{DC}}\cdot y| \tag{12}$$

where $mvdist_{FG}$ is the delta of the foreground MV, $MV_{FG}$.x is the horizontal component of the foreground MV and $MV_{FG}$.y is the vertical component of the foreground MV. A similar equation may be used for background MVs.

In some examples, a difference between the foreground and background MVs may be determined, according to equation (13):

$$mvdist_{FGBG} = |MV_{FG}\cdot x - MV_{BG}\cdot x| + |MV_{FG}\cdot y - MV_{BG}\cdot y| \tag{13}$$

where $mvdist_{FGBG}$ is the delta between the foreground MV and the background MV.

Deltas may then be defined from foreground to global foreground and global background and from background to global foreground and global background. For example, MV distance from foreground to global foreground may be defined according to respective horizontal and vertical components of the foreground MV and the previous global foreground MV, MV distance from foreground to global background may be defined according to respective horizontal and vertical components of the foreground MV and the previous global background MV, MV distance from background to global foreground may be defined according to respective horizontal and vertical components of the background MV and the previous global foreground MV, and MV distance from background to global background may be defined according to respective horizontal and vertical components of the background MV and the previous global background MV.

From these defined distances, a bGoodBGFG flag may be determined. The bGoodBGFG flag may true when both of the following conditions are met: the difference between the background MV and the global background MV is less than half of the difference between the background MV and the global foreground MV and the difference between the foreground MV and the global foreground MV is less than half of the difference between the foreground MV and the global background MV.

The background MV ($MV_{BG}$) may be reliable when bGoodBGFG is true and the SAD of the background MV is minimized or when 1) the SAD of the background MV is minimized, 2) the maximum of MVDIFF of the background MV and the SAD of the background MV is less than the minimum of th1 and half the difference between foreground and background MVs, 3) the difference between foreground and background MVs is greater than thr2, 4) SAD of the occluded MV is greater than the maximum of thr3 and SAD of the background MV, and 5) the MVDIFF of the occluded MV is greater than thr4.

In other words, the background MV may be reliable when one of the following conditions are met:

$$isReliableBG_1: \left(bGoodBGFG \&\& MV_{BG} \cdot sad < \min(thr0, MV_{OCC} \cdot sad)\right.$$

$$isReliableBG_2:$$

$$(MV_{BG} \cdot sad \leq \min(thr0, MV_{OCC} \cdot sad) \&\& \max(MV_{BG} \cdot mvdiff, mvdist_{BG}) < \min\left(th, 1\frac{mvdist_{FGBG}}{2}\right) \&\& mvdist_{FGBG} > thr2 \&\& MV_{OCC} \cdot sad \geq \max(thr3, MV_{BG} \cdot sad) \&\& MV_{OCC} \cdot mvdiff > thr4 isReliableFG = isReliableBG_1 \| isReliableBG_2$$

The foreground MV may be reliable when 1) the background MV is reliable, 2) MVDIFF of the occluded MV is greater than thr5, 3) difference of the foreground MVs is less than (thr6, half SAD of the foreground MV is less than thr7, 4) the SAD of the foreground MV is less than thr7.

In other words, the foreground MV may be reliable when the following conditions are met:

$$isReliableFG = isReliableBG \&\& MV_{OCC} \cdot mvdiff > thr5 \&\& mvdist_{FG} < \left(thr6, \frac{mvdist_{FGBG}}{2}\right) \&\& MV_{FG} \cdot sad < thr7$$

At 518, method 500 includes accumulating reliable foreground and background MVs and averaging the foreground and background MVs for each region and for the whole frame. For a given region (h, v), if the reliable number of foreground and background MVs (e.g., fgcnt and bgcnt) is too small, foreground and background MVs may be changed according to equations (14):

$$RMV_{FG(h,v)} \cdot x = \frac{\left(GlbFGMV \cdot x * \left(thr_{FG} - wfg_{(h,v)}\right) + wfg_{(h,v)} * RMV_{FG(h,v)} \cdot x\right)}{thr_{fg}} \tag{14}$$

$$RMV_{FG(h,v)} \cdot y = \frac{\left(GlbFGMV \cdot y * \left(thr_{FG} - wfg_{(h,v)}\right) + wfg_{(h,v)} * RMV_{FG(h,v)} \cdot y\right)}{thr_{fg}}$$

$$RMV_{BG(h,v)} \cdot x = \frac{\left(GlbBGMV \cdot x * \left(thr_{BG} - wbg_{(h,v)}\right) + wbg_{(h,v)} * RMV_{BG(h,v)} \cdot x\right)}{thr_{bg}}$$

$$RMV_{BG(h,v)} \cdot y = \frac{\left(GlbBGMV \cdot y * \left(thr_{BG} - wbg_{(h,v)}\right) + wbg_{(h,v)} * RMV_{BG(h,v)} \cdot y\right)}{thr_{bg}}$$

where RMV is regional MV of foreground or background for horizontal or vertical motion, depending on the equation, GlbFGMV is global foreground MV, GlbBGMV is global background MV, $wfg_{(h,v)}=\min(thr_{FG}, RMV_{FG(h,v)}.fgcnt)$, and $wbg_{(h,v)}=\min(thr_{BG}, RMV_{BG(h,v)}.bgcnt)$.

In this way, reliable foreground and background MVs may be generated based on MV fields between CF and PF and PF and PPF.

Figure 6:
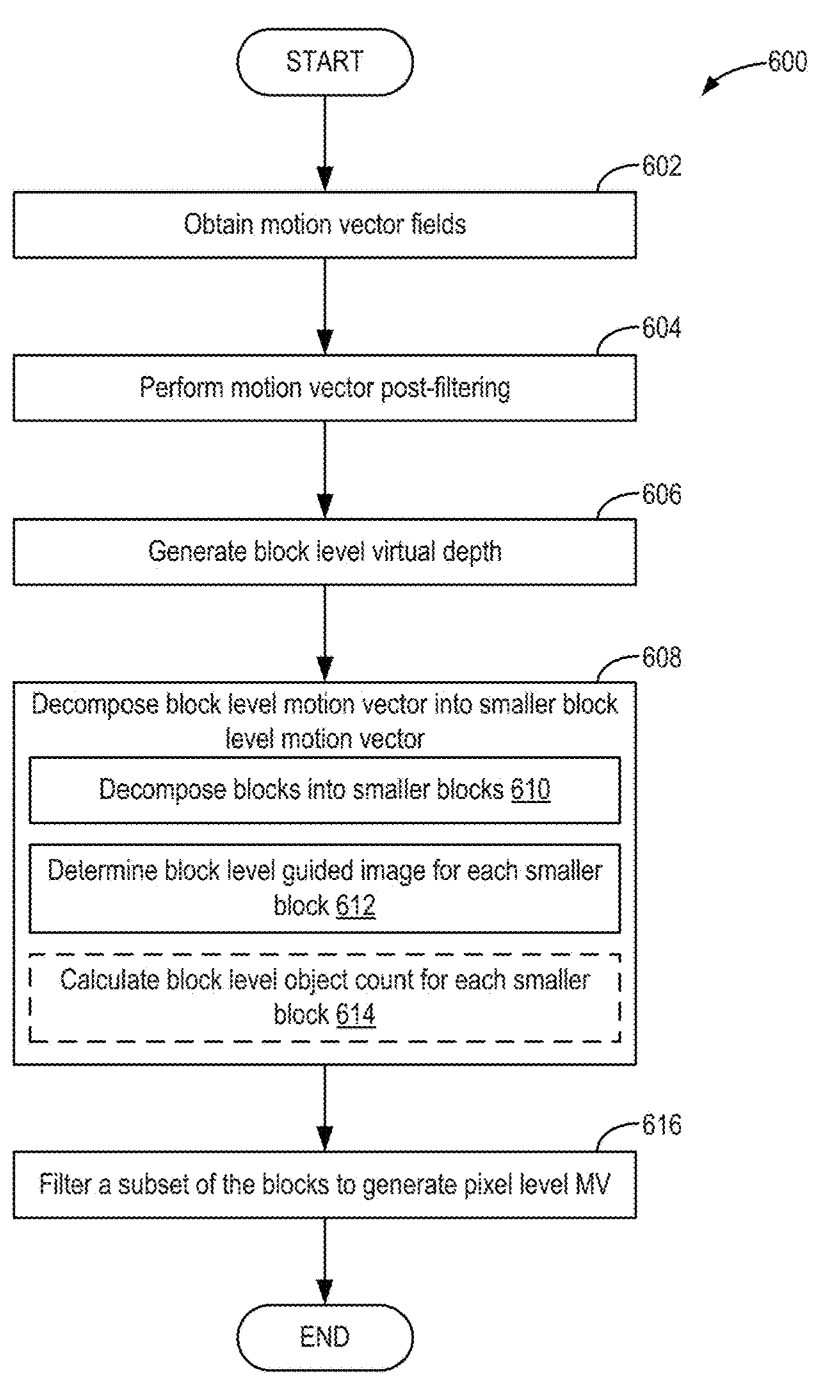
FIG. 6 shows a flowchart illustrating a method for motion vector post-filtering.

Turning now to FIG. 6, a flowchart illustrating a method 600 for MV processing is shown. The method 600 may be carried out using the systems and components described herein above with regard to FIGS. 1-2. For example, the method 600 may be carried out by one or more processors according to instructions stored in memory. For example, instructions may be stored and executed by an image processing system, such as the image processing system 200. The image processing system herein described may be part of or otherwise communicably coupled to a computer system, such as computer system 100, which includes game engines (e.g., GPUs, CPUs, etc.). Method 600 may be incorporated into method 300 of FIG. 3, specifically at 304.

At 602, method 600 comprises obtaining MV fields. As described with respect to FIG. 4, MV fields may be obtained between a PF and a CF and between the PF and a PFF. MV fields between the PF and the CF may comprise MVs for each block of the PF (e.g., internal block level phase 0 MV of PF, or $iBMV_{PF0}$) and for each block of the CF (e.g., internal block level phase 1 MV of CF, or $iBMV_{CF1}$). MV fields between the PPF and the PF may comprise MVs for each block of the PPF (e.g., internal block level phase 0 MV of PPF, or $iBMV_{PP0}$) and for each block of the PF (e.g., internal block level phase 1 MV of PF, or $iBMV_{PF1}$). As MVs are calculated for each block of the PF, CF, and PPF, MVs for the first block (m, n) may be obtained. Further, obtaining MVs for the block (m, n) may comprise obtaining SAD and MVDIFF values for that block, as they are calculated during calculation of MVs, as described with respect to FIG. 4. In some examples, the obtained MV fields may include foreground and background MVs, including global foreground and background MVs as well as regional foreground and background MVs, which may be detected as described with respect to FIG. 5.

At 604, method 600 comprises performing MV post-filtering. MV post-filtering may comprise, in some examples, calculating averages for specified windows, smoothing, and reducing the MVs. For example, MV post-filtering may be performed for unreliable areas to generate filtered output MVs. In some examples, MV post-filtering may comprising using regional and global foreground MVs and regional and foreground background MVs to replace unreliable MVs.

At 606, method 600 includes generating block level virtual depths. Virtual depths may be demanded in order to generate output images by reprojection and/or frame interpolation. For a given block, e.g., first block (m, n), depth may be calculated according to equation (15):

$$iBD_{(m,n)} = \max(0, \text{depth}_i + k_3 * (mvdist2fg - mvdist2bg) + k_4 * iBMV_{m,n} \cdot mvdiff \tag{15}$$

where $iBD_{(m,n)}$ is virtual depth of the first block (m, n), $\text{depth}_i$ is an initial depth value, mvdist2fg is a difference in MVs between a current MV and a corresponding regional foreground MV, mvdist2bg is a difference in MVs between a current MV and a regional background MV, and $iBMV_{(m,n)}$.mvdiff is a double confirmed MVDIFF for the MV of the first block (m, n). The regional foreground or background MVs used to determine the differences in MVs may be bilinear interpolated MVs (foreground or background) for the first block (m, n) with four neighboring regional MVs (foreground or background).

At 608, method 600 includes decomposing block level MV fields into smaller block level MV fields. As previously described, luma images may be comprised of pixels and partitioned into a plurality of equally sized blocks. As an example, a luma image may be partitioned into 8×8 pixel blocks. MVD calculation and processing as described with respect to FIGS. 4-5 may be performed at the block level. Optionally, there is object mask which label each pixel belongs to object or not, only the pixels belong to object to be processed.

Decomposing block level MVD fields into pixel level MVD fields may comprise decomposing blocks into smaller blocks to improve precision of the pixel MVD, as noted at 610, for example, the guide or reference image can be the luma of smaller blocks, determining the block level guide image for each smaller block, as noted at 612, and, optionally, if there is object mask, then count the number of object pixels inside of each smaller blocks, as noted at 614. As an example, an 8×8 pixel block may be decomposed to four 4×4 pixel blocks. The guide image may be used to improve accuracy of the pixel level MV. The guided image may be depth information, luma information, or some other pixel level information that identifies different objects in the scene of the image. The guide may be used to weight interpolation of the MV between blocks or may be used in a regression approach such as a guided filter, as will be further described. In some examples, the block MVs that belong to the same object as the pixel MV is weighted higher than the block MVs that do not belong to the same object as the pixel MV.

At 616, method 600 includes filtering a subset of the smaller blocks to generate a pixel level MVD field. For each pixel (i, j), a plurality of MVDs for a window of smaller blocks around the pixel may be obtained, for example 5 by 5 blocks (denote these blocks with nebblks) around the pixel. In some examples, not all blocks within the window (e.g., the 5×5 block window) may be filtered. If there is an object mask, only blocks that belong to the same object as the current pixel may be filtered. Further, only blocks whose brightness level (e.g., pixel intensity) is within a range of the brightness level of the pixel in question may be filtered.

In some examples, filtering may comprise weight calculation for brightness adjustment and weighting, spatial weighting, and object mask weighting (if present) for a given block. Brightness adjustment and weighting may comprise calculating brightness difference between the current pixel and each surrounding block of the window and then averaging the brightness differences. The average brightness difference may then be adjusted according to equation (16):

$$brtdiff_{avg} = \min\left(thr0,\ \max\left(thr1,\ 1 + brtdiff_{avg}\right)\right) \tag{16}$$

where $\text{brtdiff}_{avg}$ is the average brightness difference. The weight of the brightness may then be calculated according to equation (17):

$$\text{w\_brt}_{(m,n)} = \max\left(0,\ brtdiff_{avg} - \text{abs}\left(\text{brt\_nebblks}_{(m,n)} - brt_{(i,j)}\right)\right) \tag{17}$$

where $\text{w\_brt}_{(m,n)}$ is the weight of the brightness for the given block (m, n) of nebblks, $\text{brt\_nebblks}_{(m,n)}$ is brightness of block (m,n) of nebblks, and $\text{brt}_{(i,j)}$ is brightness of pixel (i,j)

Based on the weight of the brightness, the weight of the spatial, and the weight of the object mask, the weight of the given block may be determined, where the weight of the given block is the product thereof, as described by equation (18):

$$w_{(m,n)} = \text{w\_brt}_{(m,n)} * \text{w\_spat}_{(m,n)} * \text{w\_obj}_{(m,n)} \tag{18}$$

where $w_{(m,n)}$ is weight of the given block (m, n), $\text{w\_spat}_{(m,n)}$ is weight of spatial for the given block, and $\text{w\_obj}_{(m,n)}$ is weight of object mask. If there is no object mask, $\text{w\_obj}_{(m,n)}$ may be equal to a constant value c.

The weight of the given block may then allow for generation of the output image. In some examples, for each component of the MVD, the output may be generated according to equation (19):

$$x_o(i,\ j) = \frac{\sum_{m=-2}^{2}\sum_{n=-2}^{2} w_{(m,n)} * x_{i(m,n)}}{\sum_{m=-2}^{2}\sum_{n=-2}^{2} w_{(m,n)}} \tag{19}$$

where $x_o(i, j)$ denotes a component (it can be horizontal motion, or vertical motion or depth) of decomposed pixel level MVD for pixel (i, j) and $x_{i(m,n)}$ is a component of input block level MVD for nebblks (m,n).

Block level MVD decomposition, including the filtering as herein described, may allow for increased quality of the MVD by filtering based on weights such as brightness difference, spatial, and/or object mask. The method herein for block level MVD decomposition and filtering should be understood as merely an example, other methods may also allow for generation of pixel level MVDs. For example, a guided filter that finds the best fit between input data (e.g., block level MVDs) and guide data to generate output data (e.g., pixel level MVDs). The guided filter may generate pixel level MVDs for every pixel based on values in a given window surrounding a respective pixel. The guided filter may be applied to guide images which can be luminance, full color images, depth, or object mask.

Further, in addition to the above options for decomposition, results of object segmentation may also be used as a guide, in some examples. For example, neural networks may be trained to identify whether a pixel in an image belongs to a certain type of object. Each type of object may have a different MVD associated with it and therefore using object identifiers and segmentation may allow for MV calculation and processing.

The outputs of MV calculation and processing as described herein for methods 400, 500, and 600 may generate filtered MVs with virtual depth information (MVDs) at the pixel level. These MV fields may be used for various image processing methods, including interpolation, extrapolation, and/or reprojection.

Figure 7A:
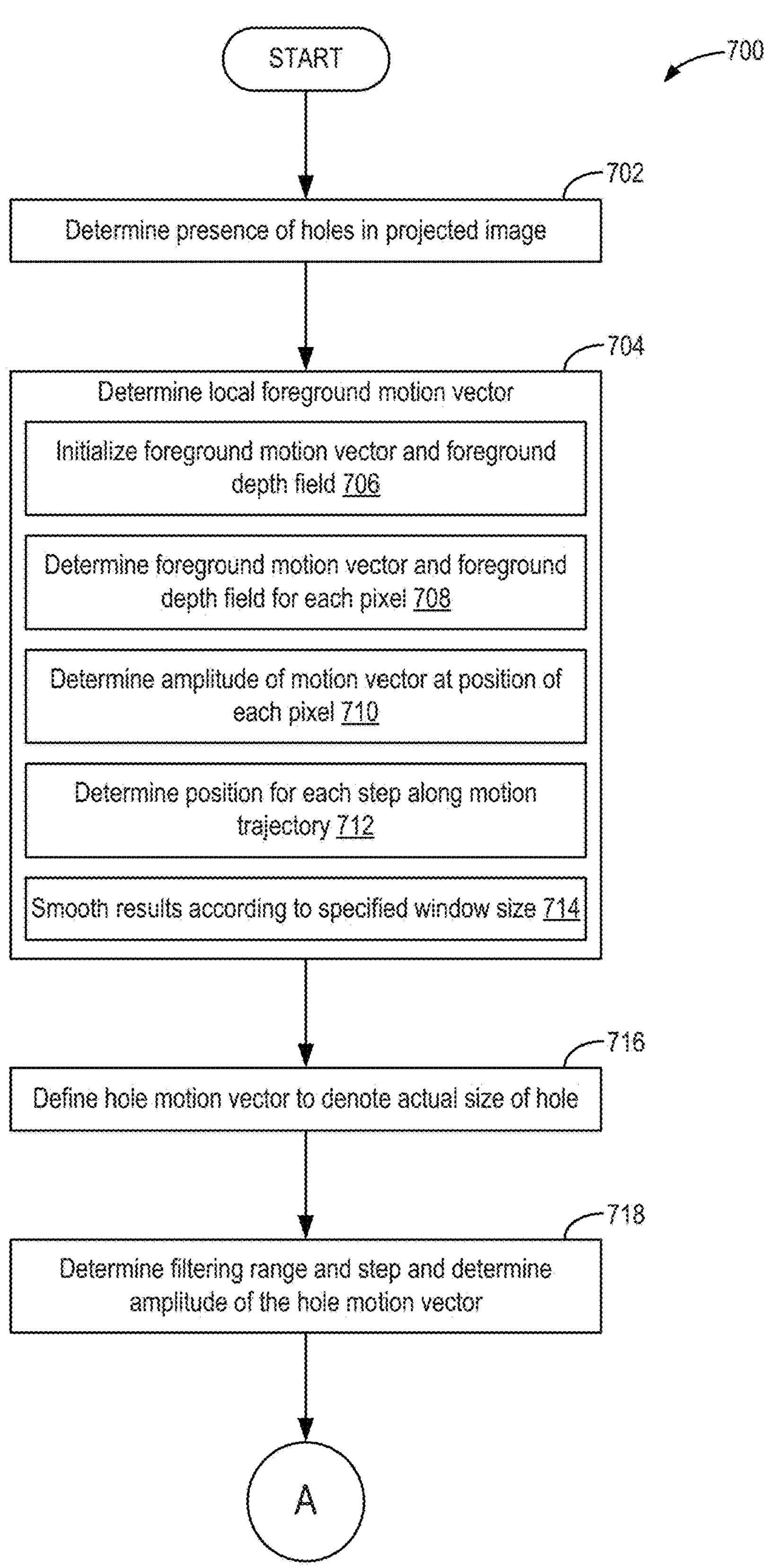
FIG. 7A shows a first part of a flowchart illustrating a method for motion vector filtering to reduce holes for inpainting.

Turning now to FIG. 7A, a flowchart illustrating a method 700 for reducing holes in images that result from reprojection, for example a triangular projection method. The method 700 may be carried out using the systems and components described herein above with regard to FIGS. 1-2. For example, the method 700 may be carried out by one or more processors according to instructions stored in memory. For example, instructions may be stored and executed by an image processing system, such as the image processing system 200. The image processing system herein described may be part of or otherwise communicably coupled to a computer system, such as computer system 100, which includes game engines (e.g., GPUs, CPUs, etc.). Method 700 may be incorporated into method 300 of FIG. 3, specifically at 306 and/or 310.

At 702, method 700 includes determining presence of holes in a reprojected (or extrapolated) image. As previously described, in some examples, reprojection and/or extrapolation may result in one or more holes in an outputted image when content previously covered is uncovered between frames. For each pixel in an input image, reprojection (or extrapolation) includes determining a projected position (e.g., position (u, v)) and depth (e.g., $d_{uv}$) according to values of MV, depth, and phase. MV, depth, and phase may be calculated or otherwise determined as described with respect to FIGS. 4, 5, and 6 above. The projected position may be determined according to equations (20) and the depth may be determined according to equation (21):

$$u = i + \text{phase} * mv_{ij} \cdot y \tag{20}$$

$$v = j + \text{phase} * mv_{ij} \cdot x \tag{20}$$

$$d_{uv} = D(i, j) + \text{phase} * Z(i, j) \tag{21}$$

where $mv_{ij}.y$ and $mv_{ij}.x$ are vertical and horizontal motion, respectively, of the MV at position (i, j) of a given pixel, D(i, j) is input depth of pixel (i, j) at time t, and Z(i, j) is change of depth of pixel (i, j) from time t to t+1.

If the projected image at the projected position (u, v) is invalid or the depth at the projected position (u, v) is larger than the depth $d_{uv}$, the depth at the projected position may be replaced with the depth $d_{uv}$ and the projected image at t+phase may be replaced with the input image for the given pixel (i, j) at time t. The projected image at the position (u, v) may be invalid when VALID(u, v) is equal to zero, which may be the initial value for the given pixel. The initial values for VALID of all position are 0 before reprojection, when position (u,v) was projected by input pixel, then set VALID (u, v) was set to 1. Once the depths and images are replaced, the validity may confirmed (e.g., VALID(u, v)=1). For example, depth may be used to determine which of one or more pixels that are projected to keep, where some pixels may be background pixels and others may be foreground pixels.

When background pixels covered by adjacent foreground at a first time (e.g., time t) are uncovered at a second time (e.g., time t+p), holes will appear in the projected image. The holes may be detected within MV fields from the first time to the second time. Holes may be uncovered when there is relative motion between the foreground and the background. The MV field may be filtered to reduce the size of the hole, as will be described below. Method 700 herein describes filtering, where filtering may comprise finding foreground MVs for each pixel by comparing depths with depths of neighboring pixels and filtering an MV field around an uncovered area to generate a filtered output MV field. Range of neighboring pixels may be determined by MV amplitude and phase of the projected image. Points along a motion trajectory may be filtered.

At 704, method 700 includes determining a local foreground MV. Determining the local foreground MV comprises initializing foreground MV field and foreground depth field, as noted at 706. Initializing may comprise setting values to values of input MVs and input depths. Determining the local foreground MV may further comprise determining foreground MV field and foreground depth field for each pixel, as noted at 708.

As an example, for a given pixel (i, j) foreground MV field and depth field may be determined by determining the amplitude of the MV at position (i, j), as noted at 710, according to equations (22) and (23):

$$amp_{ij}^0 = \max(\text{abs}(mv_{ij} \cdot x), \text{abs}(mv_{ij} \cdot y)) \tag{22}$$

$$adj_x^0 = \frac{mv_{ij} \cdot x}{amp_{ij}^0} \tag{23}$$

$$adj_y^0 = \frac{mv_{ij} \cdot y}{amp_{ij}^0} \tag{23}$$

where $$amp_{ij}^0$$

is amplitude of MV at position (i, j) and $$adj_x^0$$

and $$adj_y^0$$

are respective horizontal and vertical components of a normalized motion vector.

For the given pixel (i, j), its range for processing may also be determined, according to equation (24):

$$r_{ij} = \begin{cases} \max\left(1, \text{round}\left(k_0 * \text{phase} * amp_{ij}^0\right)\right), & \text{if } amp_{ij}^0 > 0 \\ 0 \end{cases} \tag{24}$$

where $r_{ij}$ is range and $k_0$ is equal to 2.

Along the motion trajectory with range $[-r_{ij}, r_{ij}]$, each point of the trajectory may be checked to determine the projected position (u, v), as noted at 712. For example, for each step t, t is an integer in range of $[-r_{ij}, r_{ij}]$, the projected position $$\left(u_t^0, v_t^0\right)$$

can be determined according to equations (25):

$$u_t^0 = \text{Round}\left(i + t * adj_y^0\right) \tag{25}$$

$$v_t^0 = \text{Round}\left(j + t * adj_x^0\right) \tag{25}$$

where the variables are as previously described.

For each step t, the foreground depth of position $$\left(u_t^0, v_t^0\right)$$

is compared to the input depth of position (i, j). When the input depth of position (i, j) is less than the foreground depth of $$\left(u_t^0, v_t^0\right),$$

then replace the foreground depth of position $$\left(u_t^0, v_t^0\right)$$

with the input depth of position (i, j) and replace the foreground MV of position $$\left(u_t^0, v_t^0\right)$$

with the MV of position (i, j). Further, for each step t, input depth of position $$\left(u_t^0, v_t^0\right)$$

may be compared to foreground depth of position (i, j). When the input depth of position $$\left(u_t^0, v_t^0\right)$$

is less than the foreground depth of (i, j), then replace the foreground depth of (i, j) with the input depth of position of $$\left(u_t^0, v_t^0\right)$$

and replace the foreground MV of (i, j) with the MV of $$\left(u_t^0, v_t^0\right).$$

Additionally, the determined foreground MV field and foreground depth field may be smoothed with a specified window size of $k_1$, as noted at 714, for example via a guided filter, bilateral filter, or the like. The foreground MV field and foreground depth field as herein determined may be filtered to reduce holes, as will be described below.

It should again be understood that the given pixel herein described is representative of each pixel and determination of a local foreground MV as herein described may be performed for one or more pixels of an input image.

At 716, method 700 includes defining a hole MV for the given pixel to define actual size of the hole. In some examples, the hole MV (e.g., $hmv_{ij}$) may be a product of the phase and the difference between the MV of the given pixel (i, j) and the foreground MV of the given pixel (i, j). In other examples, the hole MV may be a product of the phase and the MV of the given pixel (i, j), which may reduce computational demands as it reduces calculation of foreground MV.

At 718, method 700 includes determining filtering range and step and determining amplitude of the hole MV. Similar to as described above, filtering range and step and amplitude of the hole MV may be determined based on equations (26) and (27):

$$amp_{ij} = \max(\text{abs}(hmv_{ij} \cdot x), \text{abs}(hmv_{ij} \cdot y)) \tag{26}$$

$$adj_x = \frac{hmv_{ij} \cdot x}{amp_{ij}} \tag{27}$$

$$adj_y = \frac{hmv_{ij} \cdot y}{amp_{ij}} \tag{27}$$

where the variables are as described above.

The filtering range and step and amplitude may be used to define a range of a warping radius and step, based on equations (28) and (29):

$$r_{wrap} = \min\left(thr_2, k_2 * amp_{ij}\right) \tag{28}$$

$$s_{ij} = \max\left(thr_3, \min\left(thr_4, \frac{r_{warp}}{taps}\right)\right) \tag{29}$$

where $r_{warp}$ is the range of warping radius, $s_{ij}$ is step, $thr_2$ is a threshold used to limit the range of pixels, taps is used to control sampling points along the motion trajectory, and $k_2$ is a parameter to adjust range of pixels used to perform MV filtering. In some examples, a default value of $k_2$ may be 0.25. A large $k_2$ value may indicate more pixels whose MVs will be filtered. A larger taps value may result in higher accuracy. In some examples, a number of points that may be filtered may be 2M+1, where M is a quotient of $r_{warp}$ and $s_{ij}$.

Figure 7B:
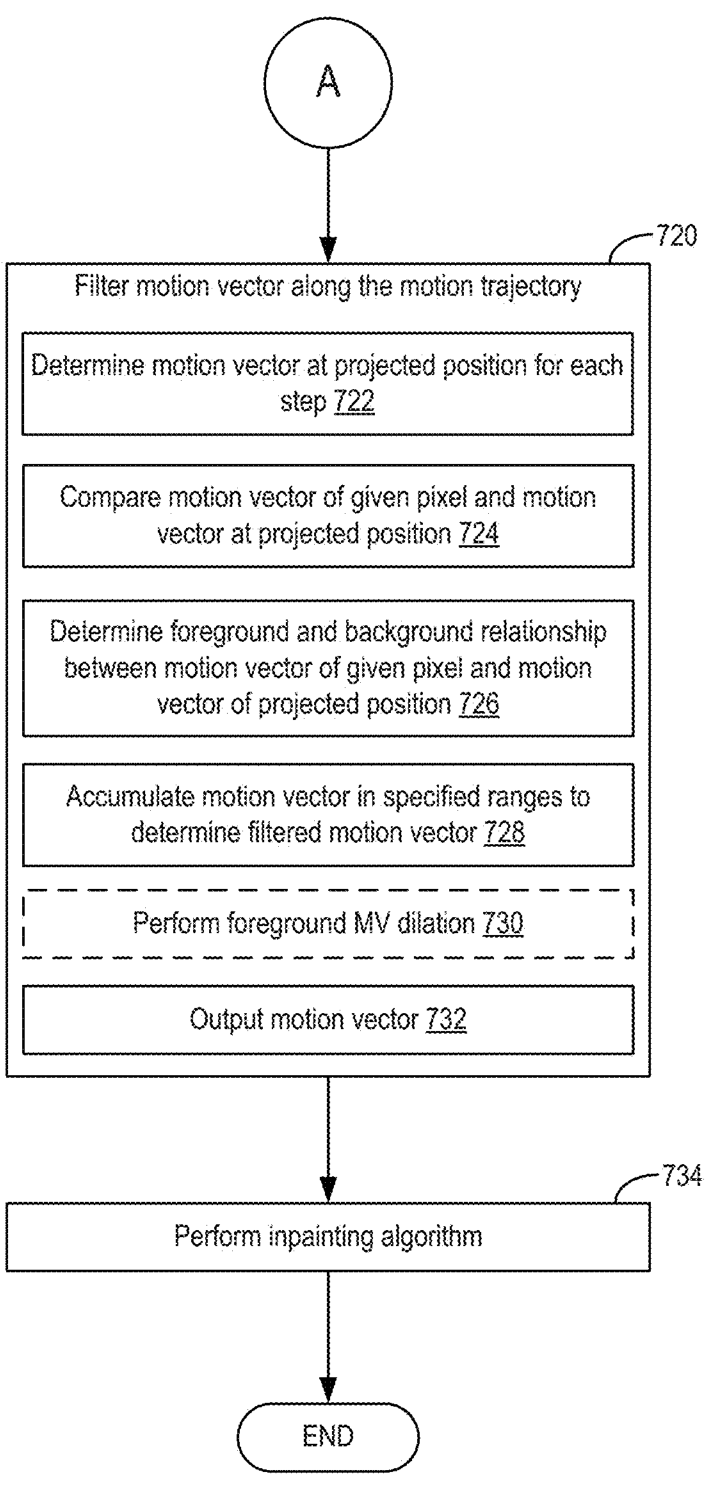
FIG. 7B shows a second part of the flowchart of FIG. 7A illustrating the method for motion vector filtering to reduce holes.

Continuing to FIG. 7B, at 720, method 700 includes filtering the MV along the motion trajectory based on the determined filtering range, step, and amplitude. Filtering the MV along the motion trajectory may include, as noted at 722, determining the MV at the projected position for each step t (e.g., position $(u_t, v_t)$). In some examples, t may be between −M and M, where M is as defined above. The projected position may be defined according to equations (30):

$$u_t = \text{Round}\left(i + t * s_{ij} * adj_y\right) \tag{30}$$

$$v_t = \text{Round}(j + t * s_{ij} * adj_x) \tag{30}$$

where the variables are as described previously.

Then, filtering the MV along the motion trajectory includes comparing the MV of the given pixel (i, j) to the MV of the projected position $(u_t, v_t)$, as noted at 724, in order to determine whether there is an uncovered relationship between the two. Determination of an uncovered relationship may be based on conditional equations (31):

$$\text{uncover}_x = \begin{cases} \text{phase} * (mv_{ij} \cdot x - mv_t \cdot x), \text{ if } j > v_t \\ \text{phase} * (mv_t \cdot x - mv_{ij} \cdot x), \text{ if } j < v_t \\ 0, \text{ if otherwise} \end{cases} \tag{31}$$

-continued $$\text{uncover}_y = \begin{cases} \text{phase} * (mv_{ij} \cdot y - mv_t \cdot y), \text{ if } i > u_t \\ \text{phase} * (mv_t \cdot y - mv_{ij} \cdot y), \text{ if } i < u_t \\ 0, \text{ if otherwise} \end{cases} \tag{31}$$

where $mv_{ij}$.x and $mv_{ij}$.y are horizontal and vertical motion components of the MV of the given pixel and $mv_t$.x and $mv_t$.y are horizontal and vertical motion components of the MV of the projected position. The value of the uncovered relationship $\text{uncover}_t$ may be a sum of horizontal component $\text{uncover}_x$ and vertical component $\text{uncover}_y$. The MV of the projected pixel may participate in filtering when the value of the uncovered relationship $\text{uncover}_t$ is greater than zero.

Filtering the MV along the motion trajectory may further comprise determining foreground and background relationship between the MV of the given pixel and the MV of the projected position, as noted at 726. In some examples, the background may be affected by the foreground but the foreground may not be affected by the background. The MV that participates in the filtering may be determined by equations (32):

$$mv'_t \cdot x = \begin{cases} mv_t \cdot x, \text{ if uncover}_t > 0 \text{ and } mv_t \cdot \text{depth} \le mv_{ij} \cdot \text{depth} \\ mv_{ij} \cdot x, \text{ otherwise} \end{cases} \tag{32}$$

$$mv'_t \cdot y = \begin{cases} mv_t \cdot y, \text{ if uncover}_t > 0 \text{ and } mv_t \cdot \text{depth} \le mv_{ij} \cdot \text{depth} \\ mv_{ij} \cdot y, \text{ otherwise} \end{cases} \tag{32}$$

where $$mv'_t \cdot x$$

and $$mv'_t \cdot y$$

are the horizontal and vertical motion components of the MV that participates in filtering, $mv_t$.depth is the depth of the MV of the projected pixel, and $mv_{ij}$.depth is the depth of the MV of the given pixel.

The MV may be accumulated in specified ranges to determine the filtered MV, as noted at 728. The specified ranges may be [−M, 0] and [0, M]. Accumulation of the MVs may be performed according to equations (33):

$$x0_{flt} = \frac{1}{M+1}\sum_{t=-M}^{0} mv'_t \cdot x,\ y0_{flt} = \frac{1}{M+1}\sum_{t=-M}^{0} mv'_t \cdot y \tag{33}$$

$$x1_{flt} = \frac{1}{M+1}\sum_{t=0}^{M} mv'_t \cdot x,\ y1_{flt} = \frac{1}{M+1}\sum_{t=0}^{M} mv'_t \cdot y \tag{33}$$

Where $x0_{flt}$ and $y0_{flt}$ are filtered horizontal motion and vertical motion with MVs in range of [−M, 0] and $x1_{flt}$ and $y1_{flt}$ are filtered horizontal motion and vertical motion with MVs in range of [0, M].

For pixels that are surrounded by both background and foreground pixels, foreground MV dilation may be performed, as noted at 730. Foreground MV dilation may reduce hole areas between foreground and background. In some examples, the inpainting algorithm may also use depth information to favor filling the hole with background information over foreground information.

The filtered MVs ($x0_{flt}$, $y0_{flt}$) and ($x1_{flt}$, $y1_{flt}$) may be merged. The MV that has a largest difference compared to the MV of the given pixel may be used to output the MV ($fmv_{ij}$), as at 732, according to equations (34):

$$fmv_{ij} \cdot x = \begin{cases} \frac{x0_{flt} + x1_{flt}}{2} + \min(\text{abs}(dist0 - dist1), diff_x), \text{ if } diff_x \ge 0 \\ \frac{x0_{flt} + x1_{flt}}{2} + \max(-\text{abs}(dist0 - dist1), diff_x), \text{ if } diff_x < 0 \end{cases} \tag{34}$$

$$fmv_{ij} \cdot y = \begin{cases} \frac{y0_{flt} + y1_{flt}}{2} + \min(\text{abs}(dist0 - dist1), diff_y), \text{ if } diff_y \ge 0 \\ \frac{y0_{flt} + y1_{flt}}{2} + \max(-\text{abs}(dist0 - dist1), diff_y), \text{ if } diff_y < 0 \end{cases} \tag{34}$$

where $dist0=|mv_{ij}.x-x0_{flt}|+|mv_{ij}.y-y0_{flt}|$ and $dist1=|mv_{ij}.x-x1_{flt}|+|mv_{ij}.y-y1_{flt}|$, $$diff_x = \begin{cases} \frac{x0_{flt} - x1_{flt}}{2}, \text{ if } dist0 \ge dist1 \\ \frac{x1_{flt} - x0_{flt}}{2}, \text{ if } dist0 < dist1 \end{cases},$$

$$\text{and } diff_y = \begin{cases} \frac{y0_{flt} - y1_{flt}}{2}, \text{ if } dist0 \ge dist1 \\ \frac{y1_{flt} - y0_{flt}}{2}, \text{ if } dist0 < dist1 \end{cases}.$$

The filtered MV may be determined in this way for each pixel of the image, thereby determining a filtered MV field. With the filtered MV field outputted, large hole areas may be divided into smaller holes.

At 734, method 700 includes performing inpainting algorithm to fill in the smaller holes. Applying the inpainting algorithm to smaller holes, as opposed to the originally generated large may mitigate unstable results of the inpainting. Further, the inpainting algorithm may be applied for holes that are surrounded by background pixels In some examples, the method 700 may be repeated one or more times in order to continue to reduce the size of the holes, and in some cases essentially eliminate the holes. In either case, whether inpainting is performed or the holes are filtered out, an output may be generated that fills holes without instability.

Turning now to FIG. 10, a third diagram 1000 is shown depicting an MV field 1002 from time t to t+1 and a filtered MV field 1004. The filtered MV field 1004 may be an outputted filtered MV when the MV field 1002 is filtered to reduce hole size, as described with respect to method 700.

The MV field 1002 may comprise foreground MVs 1006 and background MVs 1008. In some examples, as is depicted in the third diagram 1000, the foreground MVs 1006 and the background MVs 1008 may be moving in opposite directions. In other examples, the foreground MVs and the background MVs may be moving in the same direction. The MV field 1002 may comprise a first hole 1010 that results from the foreground MVs 1006 and the background MVs 1008 moving apart from each other from time t to t+1. The first hole 1010 may have a first size 1012 that is large. Holes may be considered "large" when their size is above a predefined threshold, in some examples.

The filtered MV field 1004 may comprise foreground MVs 1014 and background MVs 1016, similar to the MV field 1002. The filtered MV filed 1004 may comprise a plurality of second holes 1018. Each of the plurality of second holes 1018 may have a size that is smaller than the first size 1012 of the first hole 1010. As described with respect to FIG. 7, most of the plurality of second holes 1018 may be from background pixels, however some of the second holes 1018 may reside at edges between the foreground and background MVs. For example, third hole 1020 of the plurality of second holes 1018. The third hole 1020 may undergo foreground MV dilation, as described with respect to FIG. 7, in order to reduce the size of the hole.

Figure 11:
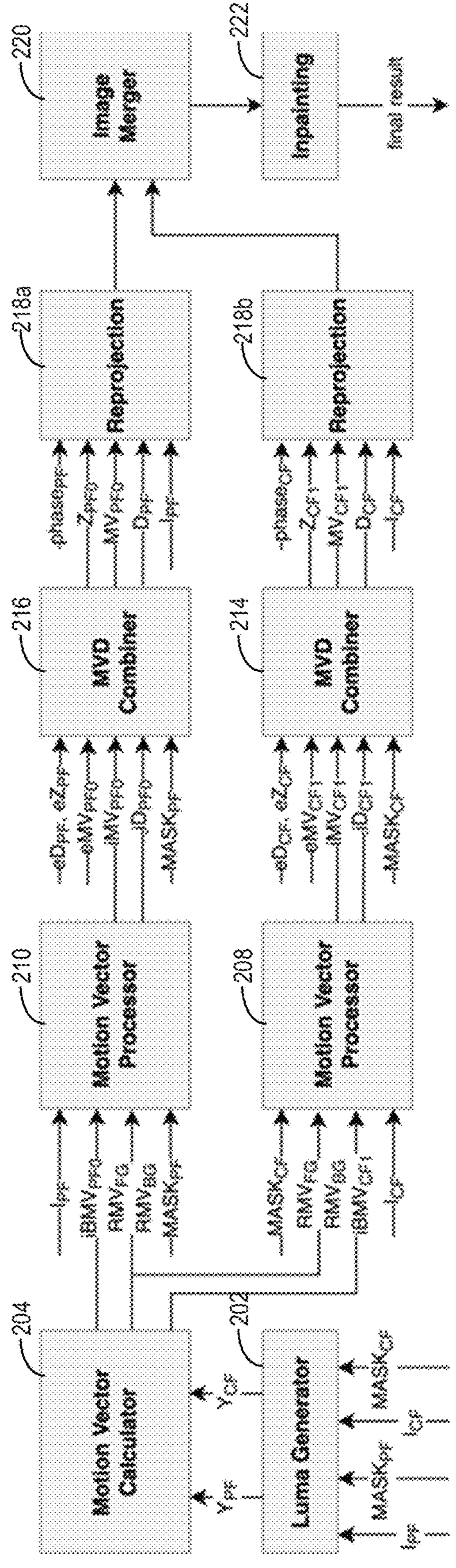
FIG. 11 shows a block diagram of a use case scenario for the image processing system of FIG. 2.

Turning now to FIG. 11, a use case scenario for an image processing system is shown. The image processing system may be the imaging processing system 200 described with respect to FIG. 2, in some examples, and therefore similar component numbering is used. Various inputs and outputs are demonstrated in the use case scenario as would occur when executing methods 300, 400, 500, 600, and 700 described above, in some examples.

In the use case scenario as shown, a current image frame CF (denoted $I_{CF}$) and a past image frame PF (denoted $I_{PF}$) with associated masks thereof are inputted into the luma generator 202. The masks may be used to mark objects and special effects in a respective frame. The luma generator 202 outputs an adjusted luma of the CF (denoted $Y_{CF}$) and an adjusted luma of the PF (denoted ($Y_{PF}$). The adjusted lumas of the CF and PF are inputted into the motion vector calculator 204. Based on one or more methods, such as methods 400 and 500, the motion vector calculator 204 may output an internal block level phase 0 MV field of the PF, regional foreground and regional background MVs, and an internal block level phase 1 MV field of the CF. The internal block level phase 0 MV field of the PF and the regional foreground and regional background MV fields, as well as the original PF and mask thereof may be inputted into the past frame MV processor 210. The internal block level phase 1 MV field of the CF and the regional foreground and regional background MVs, as well as the original CF and mask thereof may be inputted into the current frame MV processor 208.

The past frame MV processor 210 and the current frame MV processor 208 may process the inputted MV fields and regional foreground/background MV fields according to one or more methods, such as method 600 described above. Processing may include decomposition of block level to pixel level and generation of virtual depth information. Thus, the past frame MV processor 210 may output internal MV field for each pixel of the PF (denoted $iMV_{PF0}$) and an internal virtual depth field for the PF (denoted $iD_{PF0}$). Similarly, the current frame MV processor 208 may output internal MV field for each pixel of the CF (denoted $iMV_{CF1}$) and an internal virtual depth field for the CF (denoted $iD_{CF1}$). The internal MV field and virtual depth field for the PF may be inputted into the past frame MVD combiner 216 along with external MV field between PF and CF for each pixel of PF generated by game engines, external depth field generated by game engines for the PF, change of depth field from PF to CF generated by game engines, and the mask of the PF. The internal MV field and virtual depth field for the CF may be inputted into the current frame MVD combiner 214 along with an external MV field between CF and PF for each pixel of CF generated by game engines, external depth field generated by game engines for the CF, change of depth field from the CF to the PF generated by game engines, and the mask of the CF.

The past frame MVD combiner 216 may output a depth field for the PF (denoted $D_{PF}$), a change of depth field from PF to CF (denoted $Z_{PF0}$), and the MV field between PF and CF for each pixel of PF (denoted $MV_{PF0}$). The current frame MVD combiner 214 may output a depth field for the CF (denoted $D_{CF}$), a change of depth field from CF to PF (denoted $Z_{CF1}$), and the MV field between the PF and CF for each pixel of CF (denoted $MV_{CF1}$). The outputs of the past frame MVD combiner 216, along with the phase of the PF (e.g., p, projected from time t to time t+p), which is the temporal distance between the projected or target image and the input image, and the original PF may be inputted into a past frame reprojection module 218*a* of reprojection module 218. The outputs of the current frame MVD combiner 214, along with the phase of the CF (e.g., p−1, projected from time t+1 to time t+p) and the original CF, may be inputted into a current frame reprojection module 218*b* of the reprojection module 218.

In examples in which extrapolation is obtained, only the current MVD combiner 214 is utilized. A large amplitude of the phase value indicates a large time difference between the projected frame and the input frame. When the phase is positive, it indicates that the input frame is projected to the future. When the phase is negative, it indicates that the input frame is projected to the past. When extrapolation is used, only the outputs of the current frame MVD combiner 214 may be inputted into the reprojection module 218. As such, only one frame is used for reprojection and therefore holes in the reprojected image may be more numerous and/or larger than when MV processing is used for interpolation.

The reprojected images that output from the reprojection module 218 may be inputted into the image merger 220 for merging. The merged image 220 may then be inputted into the inpainter 222 for inpainting to fill holes. The inpainter 222 may output a final image.

In some examples, while not presented in this use case scenario, the MV fields that are outputted by the MVD combiner may be filtered to reduce size of holes prior to inpainting, as is described with respect to method 700.

The technical effect of the systems and methods provided herein is that MVs and virtual depths may be estimated and/or calculated based on input images rather than obtained from game engines. Estimating/calculating based on input images allows for reduction of computational and/or processing power, therefore allowing for faster rendering. Further, luma images may be created based on RGB components as well as type of content within the image, which may improve MV calculation without increasing demand on the system. Calculating and processing MVs at the block level and then decomposing the block level MVs to pixel level MVs using bilateral filter, weighted average, and/or guided filters may allow for smoother MVs that more closely fit edges of objects in luma images as well as providing for virtual depths.

Further, when previously covered data is uncovered due to motion during reprojection, filtering MVs along motion trajectories for relevant pixels/blocks may allow for reduction of hole size, which may in turn allow inpainting algorithms to be applied and output a more stable result. This may reduce processing demands by allowing a simpler, lower demand inpainting algorithm to be used. It may further reduce latency of the overall system.

As used herein, an element or step recited in the singular and proceeded with the word “a” or “an” should be understood as not excluding plural of said elements or steps, unless such exclusion is explicitly stated. Furthermore, references to “one embodiment” of the present invention are not intended to be interpreted as excluding the existence of additional embodiments that also incorporate the recited features. Moreover, unless explicitly stated to the contrary, embodiments “comprising,” “including,” or “having” an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:

determining presence of one or more holes in an outputted image, wherein the outputted image was generated based on one or more motion vector (MV) fields and depth fields;

determining a local foreground MV field and depth field for each pixel of the outputted image;

defining a hole MV field based on the local foreground MV field;

filter the hole MV field along its motion trajectory to reduce size of the one or more holes; and outputting a filtered image with one or more smaller holes.

2. The method of claim 1, further comprising performing an inpainting algorithm on the filtered image to fill the one or more smaller holes.

3. The method of claim 1, wherein filtering the hole MV field along its motion trajectory comprises determining an MV at a projected position for each step along the motion trajectory.

4. The method of claim 3, wherein filtering the hole MV field further comprises comparing an MV of a given pixel and the MV at the projected position of that pixel in the outputted image to determine which MVs to filter.

5. The method of claim 4, further comprising determining foreground and background relationship between the MV of the given pixel and the MV at the projected position.

6. The method of claim 1, wherein filtering the hole MV field along its motion trajectory comprises accumulating MVs within a specified range to determine a filtered MV field.

7. The method of claim 6, wherein the filtered MV field comprises the one or more smaller holes.

8. The method of claim 6, further comprising performing foreground MV dilation on the filtered MV field.

* * * * *